(12) United States Patent
Barron et al.

(10) Patent No.: US 12,496,455 B1
(45) Date of Patent: Dec. 16, 2025

(54) WEARABLE, NON-INVASIVE THERAPY DEVICE

(71) Applicant: EMBioSys Inc., North Andover, MA (US)

(72) Inventors: Christopher Barron, North Andover, MA (US); Vishwanath V. Subramaniam, Toronto (CA); Joseph D. West, Richwood, OH (US)

(73) Assignee: Embiosys Inc., North Andover, MA (US)

( * ) Notice: Subject to any disclaimer, the term of this patent is extended or adjusted under 35 U.S.C. 154(b) by 0 days.

(21) Appl. No.: 19/014,684

(22) Filed: Jan. 9, 2025

Related U.S. Application Data

(63) Continuation of application No. 18/402,418, filed on Jan. 2, 2024.

(60) Provisional application No. 63/478,322, filed on Jan. 3, 2023.

(51) Int. Cl.
*A61N 1/40* (2006.01)

(52) U.S. Cl.
CPC ..................... *A61N 1/40* (2013.01)

(58) Field of Classification Search
CPC ........................................... A61N 1/40
USPC ...................................... 600/12–15
See application file for complete search history.

(56) References Cited

U.S. PATENT DOCUMENTS

| 6,853,864 | B2 | 2/2005 | Litovitz |
| 7,758,490 | B2 | 7/2010 | Pilla et al. |
| 8,449,441 | B2 | 5/2013 | Sivo |
| 8,968,173 | B2 | 3/2015 | Sivo |
| 9,777,265 | B2 | 10/2017 | Subramaniam et al. |
| 9,809,810 | B2 | 11/2017 | Subramaniam et al. |
| 9,844,347 | B2 | 12/2017 | Subramaniam et al. |
| 9,885,031 | B2 | 2/2018 | Subramaniam et al. |
| 10,550,383 | B2 | 2/2020 | Subramaniam et al. |
| 10,655,121 | B2 | 5/2020 | Subramaniam et al. |
| 10,844,364 | B2 | 11/2020 | Subramaniam et al. |
| 11,027,143 | B2 | 6/2021 | Sharma |

(Continued)

FOREIGN PATENT DOCUMENTS

| KR | 1020110085708 A | 7/2011 |
| WO | 2019079589 A1 | 4/2019 |

(Continued)

OTHER PUBLICATIONS

Marina Sala de Medeiros, Debkalpa Goswami, Daniela Chanci, Carolina Moreno, Ramses V. Martinez, Washable, breathable, and stretchable e-textiles wirelessly powered by omniphobic silk-based coils, Nano Energy, vol. 87, 2021, 106155, ISSN 2211-2855, https://doi.org/10.1016/j.nanoen.2021.106155. (Year: 2021).*

(Continued)

*Primary Examiner* — Sunita Reddy
(74) *Attorney, Agent, or Firm* — Thomas E. Lees, LLC

(57) ABSTRACT

Devices are provided having human anatomical dimensions, regardless of materials made, that can deliver iEF therapy for treatment of cancer. For instance, aspects can be implemented as a wearable device for treating solid tumors. The device includes a coil of electrically conductive material supported by the wearable garment. Further, the wearable device includes a controller electrically coupled to the coil to produce an induced field for therapy.

18 Claims, 21 Drawing Sheets

(56) References Cited

U.S. PATENT DOCUMENTS

| | | |
|---|---|---|
| 11,071,875 B2 | 7/2021 | Carter et al. |
| 11,344,739 B2 | 5/2022 | Sharma |
| 11,344,740 B2 | 5/2022 | Sharma |
| 11,577,089 B2 | 2/2023 | Sharma |
| 11,583,692 B2 | 2/2023 | Sharma |
| 11,850,440 B2 | 12/2023 | Carter et al. |
| 11,944,837 B2 | 4/2024 | Sharma |
| 2003/0211797 A1* | 11/2003 | Hill ................ H05K 1/038 442/205 |
| 2004/0009729 A1* | 1/2004 | Hill ................ D03B 11/00 442/181 |
| 2005/0288744 A1* | 12/2005 | Pilla ............... A61H 39/002 607/86 |
| 2009/0227831 A1* | 9/2009 | Burnett ........... A61N 1/3603 600/13 |
| 2010/0160712 A1* | 6/2010 | Burnett ........... A61N 1/0456 600/13 |
| 2010/0298624 A1* | 11/2010 | Becker ............ A61N 2/02 600/13 |
| 2012/0146797 A1* | 6/2012 | Oskin ............. A61N 1/3918 340/573.1 |
| 2012/0302821 A1* | 11/2012 | Burnett ........... A61N 1/36021 600/13 |
| 2013/0072746 A1* | 3/2013 | Burnett ........... A61N 2/006 600/13 |
| 2013/0261711 A1* | 10/2013 | Sivo ............... A61N 1/40 607/103 |
| 2015/0353916 A1* | 12/2015 | Subramaniam ...... C12N 13/00 435/39 |
| 2015/0376598 A1 | 12/2015 | Subramaniam et al. |
| 2015/0376599 A1 | 12/2015 | Subramaniam et al. |
| 2017/0014637 A1* | 1/2017 | Basser ............ A61N 1/40 |
| 2017/0165497 A1* | 6/2017 | Lu ................ A61N 1/36017 |
| 2017/0293740 A1* | 10/2017 | Xing ............. G06Q 20/204 |
| 2017/0296837 A1* | 10/2017 | Jin ............... A61N 2/004 |
| 2018/0037882 A1 | 2/2018 | Subramaniam et al. |
| 2018/0127737 A1 | 5/2018 | Subramaniam et al. |
| 2018/0171326 A1 | 6/2018 | Subramaniam et al. |
| 2019/0299019 A1* | 10/2019 | Chornenky ........ A61N 2/02 |
| 2020/0254272 A1* | 8/2020 | Sharma ........... A61P 35/00 |
| 2020/0290039 A1 | 9/2020 | Garg et al. |
| 2020/0353274 A1* | 11/2020 | Ansari ........... A61N 2/008 |
| 2021/0016101 A1* | 1/2021 | Ansari ........... H01F 7/064 |
| 2021/0052910 A1 | 2/2021 | Carter et al. |
| 2021/0169417 A1* | 6/2021 | Burton ........... A61B 5/4857 |
| 2021/0251850 A1* | 8/2021 | Sharma .......... G02F 1/017 |
| 2021/0272664 A1 | 9/2021 | Carter et al. |
| 2021/0339035 A1 | 11/2021 | Carter et al. |
| 2021/0361966 A1* | 11/2021 | Sharma .......... A61B 8/4227 |
| 2022/0062622 A1* | 3/2022 | Errico ........... A61N 1/36007 |
| 2022/0118269 A1 | 4/2022 | Carter et al. |
| 2022/0193436 A1* | 6/2022 | Helekar ......... A61N 2/06 |
| 2023/0201619 A1 | 6/2023 | Sharma |
| 2023/0271025 A1 | 8/2023 | Sharma |
| 2023/0372185 A1* | 11/2023 | Wu ............. A61H 1/008 |

FOREIGN PATENT DOCUMENTS

| | | |
|---|---|---|
| WO | 2019142196 A1 | 7/2019 |
| WO | 2019164903 A1 | 8/2019 |
| WO | 2021149864 A1 | 7/2021 |
| WO | 2021149884 A1 | 7/2021 |
| WO | 2022147212 A1 | 7/2022 |
| WO | 2023049492 A1 | 3/2023 |

OTHER PUBLICATIONS

Jones et al.; Design and characterization of an electromagnetic probe for distinguishing morphological differences in soft tissues; Review of Scientific Instruments 89, 084302; 2018.

\* cited by examiner

WEARABLE, NON-INVASIVE THERAPY DEVICE

CROSS REFERENCE TO RELATED APPLICATIONS

This application is a continuation of U.S. patent application Ser. No. 18/402,418, filed Jan. 2, 2024, which claims the benefit of U.S. Provisional Patent Application Ser. No. 63/478,322, filed Jan. 3, 2023, having the title "WEARABLE, NON-INVASIVE DEVICE FOR TREATING SOLID TUMORS", the disclosure of which is hereby incorporated by reference.

BACKGROUND

Field of the Disclosure

Various aspects of the present disclosure relate generally to the treatment of solid masses such as tumors, cancers, etc., and in particular, to wearable, non-invasive therapy devices for the treatment of such solid masses.

Description of Related Art

Cancer is a term used to describe abnormal cells that do not possess the ability to stop growing. Such cancers can be classified as being either a liquid tumor in the blood or bone marrow (e.g., a lymphoma or leukemia), or a solid tumor (e.g., a solid growth that forms a mass on an organ or other body structure). In this regard, pharmaceutical treatment with chemotherapy and combination immuno-chemotherapy (i.e., immuno-oncological (I-O) therapy) has proven effective in treating liquid cancers, including lymphomas and leukemias. Moreover, the success of such I-O therapies has led to a flurry of activity in drug development and research for the treatment of solid tumors. Unfortunately, such pharmaceutical treatments have not had the same success in treating solid cancers.

BRIEF SUMMARY

According to aspects of the present disclosure, a wearable device is provided, for treating solid masses such as cancers, tumors, etc. The wearable device includes a coil of electrically conductive material supported by a wearable garment. Further, a controller is electrically coupled to the coil to produce an induced electric field (iEF) for therapy.

According to certain aspects of the present disclosure, the controller of the wearable device includes a signal generator to drive the coil. For instance, the signal generator can output a signal that is asymmetric in time, such as a periodic signal where each period is asymmetric (e.g., a sawtooth waveform), an aperiodic signal that is also not symmetric, etc.

The wearable device can also optionally include a feedback loop. For instance, the feedback loop can act as a means to determine the effectiveness of iEF therapy by monitoring changes in the electrical characteristics of tumors during treatment. For instance, the feedback loop can act as a means to determine whether the iEF being delivered at a site of a tumor is still what the iEF was designed to deliver. In another example implementation, the feedback loop acts as both a means to determine the effectiveness of iEF therapy as it happens by monitoring changes in the electrical characteristics of tumors and as a means to determine whether the iEF being delivered at a site of a tumor is still what the iEF was designed to deliver.

According to further aspects of the present disclosure, a device for administering therapy, comprises a washable, wearable garment. The garment comprises a conductive coil integrated into a fabric of the garment, and a controller. For instance, the conductive coil may be woven, sewn, stitched, etc., into the garment. The controller comprises a waveform generator that produces a time-varying drive signal such that when the drive signal is communicably coupled to the conductive coil of the garment, a non-targeted induced electric field is generated.

According to yet further aspects of the present disclosure, a device for administering therapy is provided. The device comprises in general, a washable, wearable garment. More particularly, the garment comprises a conductive coil stitched into a fabric of the garment. The device also comprises a controller. The controller comprises a waveform generator that produces a sawtooth drive signal, where a frequency of the sawtooth drive signal is set to optimize how quickly a magnetic induction can change with time to produce an induced electric field having the highest possible magnitude. In this regard, when the drive signal is communicably coupled to the conductive coil of the garment, a non-targeted induced electric field is generated.

According to yet further aspects of the present disclosure, a device for administering therapy is provided. The device comprises a washable, wearable garment, and a controller. The garment comprises a conductive coil stitched into a fabric of the garment. The controller includes a waveform generator that produces a sawtooth drive signal, where a frequency of the sawtooth drive signal is set to optimize how quickly a magnetic induction can change with time to produce an induced electric field having the highest possible magnitude. The controller further comprises a feedback that enables to the controller to detect changes in a mass within a patient wearing the garment by detecting variations in current flowing in a circuit with the conductive coil caused by changes in electrical characteristics in the mass within the patient that cause an applied B field to change, thus affecting the current flow in the coil. Moreover, when the drive signal is communicably coupled to the conductive coil of the garment, a non-targeted induced electric field is generated.

DETAILED DESCRIPTION

Figure 1A:
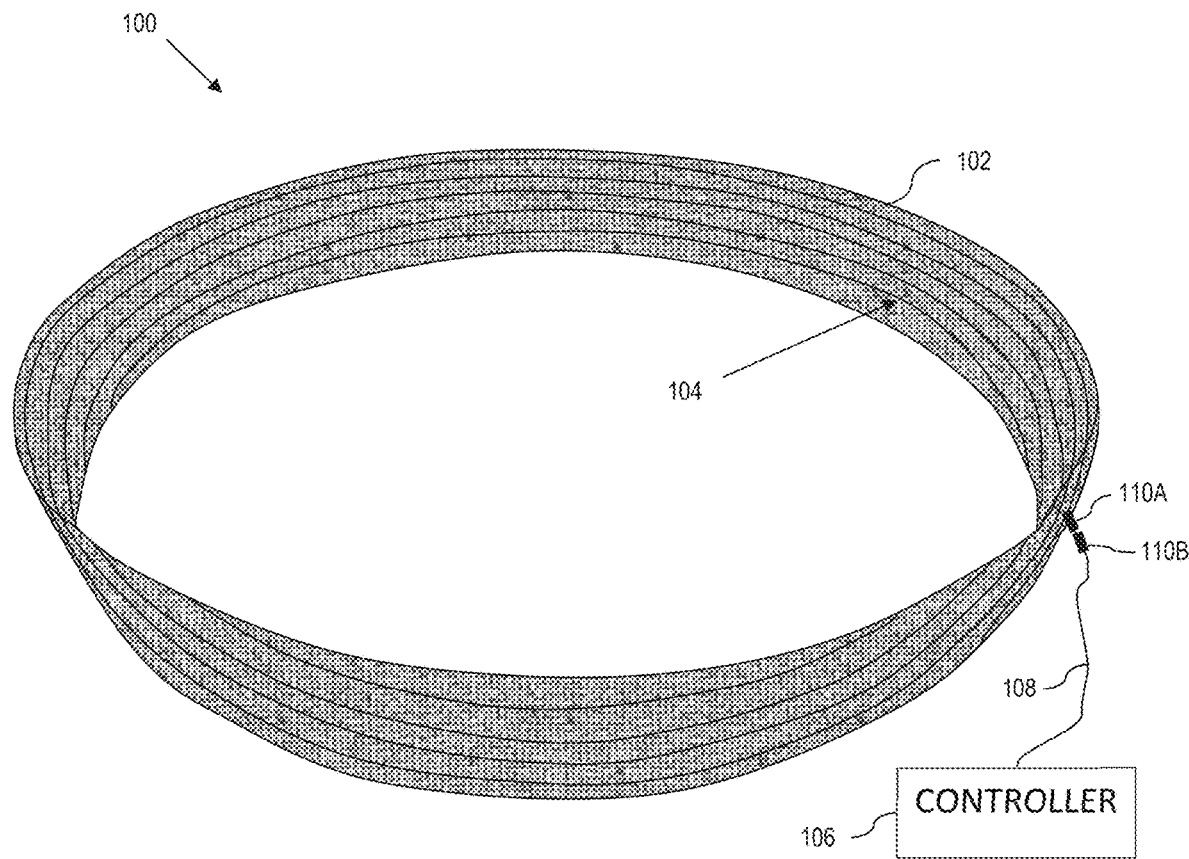
FIG. 1A is a schematic diagram of a wearable non-invasive iEF therapy device for treating solid tumors implemented as a belt, according to aspects herein.

According to some studies, about 1.9 million new cancer cases were expected to be diagnosed in the United States in 2022, accompanied by over 600,000 deaths from cancer, resulting in an average of over 1600 deaths from cancer per day. A significant number of cancer-related deaths are believed to be due to solid tumors since pharmaceutical treatment with chemotherapy and combination immuno-oncological means have been established as being effective in treating non-solid cancers (e.g., leukemia).

There is some evidence that immuno-chemotherapy therapies can be used in the treatment of solid tumors, such as breast cancer. However, sub-groups of breast cancer, such as metastatic triple-negative breast cancer (TNBC), can have a 5-year survival rate of only about 12%. For cancer patients, the standard of care (SOC) is typically neoadjuvant chemotherapy followed by surgery and adjuvant radiation, or chemotherapy, or I-O treatment. However, where the standard of care for patients results in a residual cancer burden, there is little recourse but to offer these patients the same or different chemotherapies and I-O therapies (if they qualify).

Many pharmaceutical treatments involve a mechanism that is characterized by anti-metabolic or anti-mitotic activities. Most, if not all, of these drugs operate on the current paradigm of killing cancer cells by targeting their (mostly) higher metabolic rates and mitotic activity.

However, according to aspects herein, an alternative treatment is provided, which uses induced electric fields. In some embodiments, the induced electric fields (iEFs) may have a magnitude of 1-100 microvolts per centimeter (µV/cm), and may be produced by extremely weak magnetic fields, e.g., magnetic fields of order of 10 nanotesla to 10 microtesla (10 nT-10 µT). Such iEFs can hinder the Epidermal Growth Factor-driven (EGF-driven) motility of highly metastatic Triple Negative Breast Cancer (TNBC) cells in vitro by altering the actin cytoskeletal machinery that these cells mobilize to migrate. It has been shown that no such effects of iEFs occur with normal epithelial (MCF10A) cells.

Intracellular signaling downstream of Epidermal Growth Factor—Epidermal growth factor receptor (EGF-EGFR) binding has been shown to be electrical in nature. In this regard, Epidermal growth factor receptor (EGFR) phosphorylation (i.e., binding of phosphate ion to EGFR) can be reduced by iEFs. Moreover, the serine/threonine kinase (Akt—also known as protein kinase B) signaling pathway (which is important for promoting growth and survival in response to extracellular cues) plays a role in breast cancer cells sensing the electric field and modulating their response.

In view of the above, aspects herein provide a class of wearable, therapeutic devices having coils of anatomical dimensions and relevance. As used herein, "anatomical dimensions and relevance" means that the therapeutic device is sized, shaped and otherwise constructed so as to be wearable by a person in such a way that the iEFs produced by the device affect a mass within the body of the wearer near or far from the device. In this regard, the overall form factor can vary, e.g., based upon the location of the tumor to be affected by the iEF, the style of garment, and other factors, examples of which are described in greater detail herein.

Such wearable therapeutic devices may also improve the efficacy and patient tolerance of pharmaceutical drugs that have already been developed and have either already been FDA approved or are imminently on track to obtain FDA approval or are already FDA approved for another indication. Moreover, such wearable therapeutic devices can be utilized to provide a pathway for the development of stand-alone iEF therapies.

Aspects herein further provide the combinatorial use of chemotherapeutic, targeted therapeutic, and immunotherapeutic agents in conjunction with iEF therapy as an adjuvant. Since existing pharmacological approaches target the killing of quickly replicating cells (including cancer cells) and iEF therapy targets metastasis, aspects herein use both pharmacological and iEF therapies in combination to target killing and containment (i.e. including tumor shedding, invasion and migration, intravasation, extravasation and colonization) of tumors simultaneously.

Accordingly, aspects herein provide non-pharmacological interventions that can complement an existing standard of care, provide an alternative standalone therapy, or provide an alternative combination therapy (i.e. with chemotherapies or I-O treatments).

INTRODUCTION

Aspects herein provide a wearable, non-invasive iEF therapy device, which is suitable for treating solid masses, such as tumors, cancers, etc. The device includes a controller and at least one coil that is integrated into a wearable garment (example garments are described herein, with reference to FIG. 1A-FIG. 1E). For instance, a conductive coil can be integrated into a fabric of the wearable garment (e.g., stitched, woven, etc.) so that the coil is integral with the garment.

In practical applications, the wearable garment may be flexible, stretchable, form-fitting, washable, customizable, or any combination thereof. Moreover, the garment can take the shape of a conventional garment. In this regard, the wearable garment may look effectively like a typical garment that a patient would choose to wear, e.g., a belt, scarf, hat, cap, shirt, bra, camisole, tee-shirt, pants, socks, undergarment, glove, or any other piece of clothing, etc.

Alternatively, the garment can take a shape that is particularized for the therapeutic effect to which the treatment is applied. For instance, the wearable garment may take a shape, such as a band, sleeve, skin patch, etc., (which may not resemble a normal garment), but that is conducive to comfortably wearing the garment for extended periods of time.

Moreover, depending on the location of the mass within the patient's body, the anatomical geometry of the device may dictate the type of wearable garment. As such, in some implementations, a device can be specifically designed to treat a specific type of cancer, e.g., breast, gastric, etc. Here, the coil and garment can cooperate to implement a targeted iEF field. In other embodiments, a device includes a wearable garment having a coil that generates a non-targeted induced electric field. In a non-targeted application, the iEF can directly affect a solid tumor of the wearer, or the iEF can indirectly affect a solid tumor, such as by interacting with nervous system pathways or a host immune response of the patient, as will be described more fully herein.

In general, the wearable garment includes an integrated coil (or coils) that deliver the iEF treatment, as will be described more fully herein. In this regard, the wearable garment functions to position the coils relative to a patient such that the induced electric fields target or otherwise affect a mass (e.g., tumor, cancer, etc.) within the patient. In this regard, the patient physiology, specific mass of the patient being addressed, and other factors may affect the wearable garment shape and/or coil shape.

Some wearable garments wrap around the patient, e.g., wrap around the torso, limb, neck, head, appendage, digit, etc., of the patient. Correspondingly, the coils associated with the garment may also wrap around the patient (e.g., wrap around the torso, limb, neck, head, appendage, digit, etc.) when the garment is worn. For instance, the coil can wrap around the head, neck, chest, waist, hips, etc., of the patient. The coil can also wrap around an arm, leg, hand, foot, etc., of the patient. In this regard, the coil can be a three-dimensional coil.

However, in other example implementations, the coils may be oriented relative to the garment so as to not entirely wrap around, surround, or circumscribe either the torso or any limb, neck, head, appendage, digit, etc., of a patient when the garment is worn. Here, the coil can spiral or otherwise wrap (in any shape) throughout a portion of the garment in a manner that allows placement of the coil in a designated anatomical area. As a few illustrative examples, the coil can be placed on an anterior side of the patient when the garment is worn, so as to align with the breast, chest, etc. The coil can align with a posterior side of the patient when the garment is worn, e.g., to align with a back of the neck, shoulders, lower back, etc. The coil can also align with a lateral side of the patient when the garment is worn, e.g., to align with the side/rib area of the patient, etc.

The coil integrated into the garment can be open-ended, or close-ended. In an open-ended coil configuration, the coil is integrated into the garment so as to leave two "free" ends of the coil. Each coil end can be permanently or temporarily coupled to a controller. This enables the coil to receive a drive signal from the controller, thus creating the iEF. Here, the controller can couple to the coil via wires, electrical connectors, circuit board traces, conductive printing, other physical/electrical connection, or combination thereof, etc. As an example, the coil can include a first end and a second end. The first end couples to an output of a signal generator via a coil driver of the controller. The second end of the coil couples back to complete a circuit with the controller. The controller itself may be integrated into the garment, or the controller may be external to the garment.

In other implementations, the coil may be close-ended. Here, the coil is integrated into the garment such that the coil ends electrically join together so that there is no "free" end of the coil. That is, a first end of the coil couples to a second end of the coil thus forming a closed loop. Here, the controller couples the drive signal to the coil via induction to generate the iEF.

In some embodiments, the coil is integral with the garment. In this regard, the windings of the coil may not be visible as they integrate into the material of the wearable garment. For instance, the conductive wire of the coil can be implemented as conductive thread that allows washing, bending, flexibility, stretching, other movements, combinations thereof, etc. In this regard, the garment may even feel like a normal garment to the patient.

For instance, the coil can be integrated into the fabric of the wearable garment by implementing a coil wire as a conductive thread. In some embodiments, the "conductive thread" can be made up of an insulative sleeve that contains a single conductor or a strand of conductors. As another example, the conductive thread can comprise a plurality of wires or wire strands intertwined, braided, or both. Moreover, the conductive thread can include a strengthening fiber or other strengthening structures. Here, the plurality of wires or wire strands can optionally be further collectively contained in an outer insulative sleeve. Moreover, each wire or wire strand can optionally be individually shielded with an insulative sleeve. This allows a "thread" comprised of conductive wire, to be flexible, stretchable (e.g., due to the gaps in the braiding or intertwining), etc., so that the conductive thread integrates into the fabric of the garment.

As a practical example, wire is made into a thread that uses a plurality, e.g., 10-20 or more conducting wires (e.g., 40-46 AWG wires), wound in a braided and/or intertwined manner. Further the thread can be braided and/or intertwined with one or more fibers, e.g., para-aramid fibers. A benefit and characteristic of this thread is that the braided winding allows the thread to be stretchy while at the same time being strong and highly resistant to breaking.

For instance, the coil can be integrated into the fabric of the wearable garment by implementing a coil wire as a conductive thread sewn into the garment using at least one of weaving, knitting, or crocheting. As yet another example, the coil can be integrated into the fabric by using at least one of felting, lacing, bonding, fusing or laminating. Still further, the coil can be printed onto the fabric. Moreover, the coil can be manufactured directly into the garment at the time of manufacture of the garment, or the coil can be subsequently sewn into the garment.

In this regard, the wire used to create the "thread" can be the same gauge or a combination of gauges, solid wire or stranded, or any combination thereof. For instance, wire gauges in the range of 40-46 gauge may be used for finer threads. Wire gauges in the 20's or 30's gauge range can also be used, depending upon the application. The insulation or wire coating can be an enamel, formvar, polyamide, polyurethane, polyurethane nylon, or other suitable material so long as an iEF field is achieved.

The direct integration of the coil into the garment provides numerous advantages over forming a coil and adding the coil to a garment as a "layer" or as an attachment, such as by using the garment as a mere carrier for the coil. For instance, the garment fabric protects the coils from snagging, breaking, disconnecting from the garment, etc. Thus, the integral coil is effective for long term, repeated use by the patient, even in an environment outside direct doctor supervision during treatment. The direct integration (e.g., sewing using conductive thread) also ensures that over numerous uses, the coil better preserves the original coil shape. This has many advantages, from ensuring more consistent treatment, to further enabling a simplification of the controller, since variables such as impedance change of the coil are much more likely to be less drastic.

More particularly, movement of the coil winding can affect the coil parameters. However, aspects herein integrate the coil into the garment, e.g., via sewing, thus drastically limiting coil movement. Moreover, in the present disclosure, an optional encapsulation, e.g., a flexible foam encapsulation, can be utilized to hinder axial movement of the windings relative to each other.

Still further, the direct integration ensures a more reliable and consistent placement of the coil so that a patient does not have to be responsible for checking the coil attachment to ensure that the coil is properly positioned. Yet further, the coil can take on any number of shapes due to the ability to sew the coil into place. This allows precision in the coil wraps, geometry, etc.

Moreover, a conductive thread is different from a conductive wire. The conductive thread, due to its design and integration, e.g., sewing, results in a different intrinsic capacitance and inductance. However, the coil design can be manipulated accordingly by varying the number of turns, number of conductors used in the thread, diameter of the conductors used, the reinforcement material (e.g., para-aramid fibers) used if any, etc. Additionally, a design can vary the coil geometry (circular cross section, rectangular cross section), etc.

The coil is electrically coupled to a controller. In practical applications, the controller can be integrated into the wearable garment, or the controller can be an external device, e.g., worn on a belt clip, pocket, etc. Where the controller is integral with the garment, the controller can be encased in a waterproof coating, e.g., a plastic, rubber, resin, insulation, housing, or other packaging to enable washing with the garment. Here, the controller integral with the garment can include electronics, a signal generator, battery, communications electronics, data logging electronics, any combination thereof etc. Moreover, the controller can effectively be split into multiple components that are not co-located, e.g., electronics integrated into the washable garment, and a battery or remote power source that is worn external to the garment, but which couples power to the electronics of the garment, etc.

The controller can couple to the coil via hardwiring, or the controller can be detachable from the coil, e.g., using suitable connectors. In some implementations, the low power of the coil enables the use of elastomeric connections, which are waterproof and flexible.

In this regard, the garment can be modified to include a small pocket or pouch to house a miniaturized card sized controller, which can include electronics and rechargeable battery pack. In some embodiments, the battery pack can be detachable so that the garment can be washed and the batteries can be recharged.

The controller can comprise a waveform generator that produces a time-varying drive signal, such that when the drive signal is communicably coupled to the conductive coil of the garment, a non-targeted induced electric field is generated. For instance, a non-targeted, induced electric field can have a magnitude of 1-100 microvolts per centimeter ($\mu$V/cm). In another embodiment, the non-targeted induced electric field can have a magnitude of 1 microvolt/cm ($\mu$V/cm)-100 millivolts per centimeter (mV/cm). Moreover, the non-targeted induced electric field may be produced by a magnetic field on the order of 10 nanotesla to 10 microtesla (10 nT-10 $\mu$T). In yet another embodiment, the non-targeted induced electric field may be produced by a magnetic field on the order of 10 nanotesla to 10 millitesla (10 nT-10 mT).

In some implementations, the waveform generator is configured to optimize the time-varying drive signal based upon how quickly the magnetic induction can change with time to produce an induced electric field having the highest possible magnitude. Examples of this are described in greater detail herein.

In this regard, the waveform generator can produce a time-varying drive signal, such as an asymmetric (e.g., sawtooth), periodic waveform. Here, the asymmetric, periodic waveform may comprise a sawtooth waveform having a rise time of 10 microseconds or less, and a fall time of 50 nanoseconds or less. The sawtooth may alternatively be inverted, e.g., having a fall time of 10 microseconds or less, and a rise time of 50 nanoseconds or less.

In this regard, other waveforms can be used. For instance, a waveform produced by the controller can exhibit a cycle that is asynchronous, has a different rise from fall, etc. In this regard, the waveform is adapted to the specific requirement for an iEF field.

Also, in some implementations, the waveform generator is configured to optimize the time varying drive signal to correspond to a resonance of the coil, whereas in some configurations, the drive signal is deliberately off-resonance so as to maximize the iEF.

In configurations that utilize a conductive thread, e.g., sewn or otherwise integrated into a garment, the choice of the thread material and other characteristics (number of conductors, diameter, etc.) along with the diameter of the coil, number of windings allow design selection to vary the inductance, impedance, and intrinsic capacitance. These parameters combine to yield a resonant frequency for the coil. At this resonant frequency, the current through the coil and the B field it produces are maximum. By using a waveform such as a sawtooth, a voltage is used to drive the current in the coil at a frequency specifically off resonance, which allows the device to produce a B field that varies sharply with time at certain instants during the duty cycle resulting in dB/dt that is higher than what could be achieved at resonance. Aspects herein result in sharp corners in the time-varying B field as opposed to the rounded portions, producing maximum iEF.

The controller can also include other optional features, such as a battery, a communication device (e.g., wireless transceiver), Bluetooth device, data collection device, Input/Output (I/O) device, feedback device, etc.

In some implementations, the conductive coil is integrated into a fabric of the garment so as to form a continuous coil with no coil ends, where the controller communicably couples the drive signal to the conductive coil by induction.

As another example, the coil can be integrated into the fabric of the garment so as to not surround the human torso when the garment is worn by an individual. Under this configuration, the coil, when driven by the controller, produces a heterogeneous and asymmetric B field and an induced electric field.

Still further, in some implementations, the drive signal is communicably coupled to the conductive coil of the garment so as to generate a non-targeted induced electric field that does not cause current to flow in tissue of the individual wearing the garment, hence delivering no power to the tissue of the individual wearing the garment.

In some embodiments, the garment generates a non-targeted induced electric field that stimulates a vagus or other nerve. Stimulating a vagus or other nerve can trigger a host immune system to respond to the iEF by attacking a tumor somewhere else in the body. For instance, stimulating the vagus nerve can affect a mass away from the neck, in the body.

General Approach for At-Home Garment

For medical devices that are in constant use by patients or caregivers, a common issue that impacts product reliability and device failure lies in the physical connections accessible by the user. Moreover, there are an endless number of issues and root causes, which are exacerbated by the need for the garment to be washable. With that in mind, aspects herein can provide any one or more of the following features.

The controller electronics can be embedded into the garment and not removeable, e.g., sewn into a closed pouch on the garment, instead of an open pocket.

A module that houses the controller/electronics can be waterproof/washable. Since the module will not be removeable, and is always fixed in one location on the garment, the internal connection to the coil in such a configuration can be hard-wired, eliminating the need for a connector.

In some implementations, there are no physical wires or connections between an external/removeable power module, and the controller embedded within the garment. This external power module will typically be a battery pack, but could also facilitate direct connection to AC power through a medical grade USB power brick, etc. An advantage of this configuration is that a battery can also be charged while simultaneously delivering power to the controller embedded in the garment.

In some configurations, power can be transferred from an external power module to the embedded controller through induction. Therefore, a user-accessible pocket for the external power module could have a mechanical alignment mechanism to ensure induction occurs. As another example, an external power module (e.g., implemented in a plastic enclosure) can be keyed to provide a mechanical snap fit function into the garment to guarantee proper alignment to the secondary induction coil located inside the embedded controller module.

Yet further, this still enables any desired data collection between the controller embedded in the garment and the outside world to be RF-based (i.e. Bluetooth or similar).

The above-described implementation features result in a device that does not have any user-accessible connectors or wires. It would allow for a high-reliability design and mitigate all the common issues with connector/electrical contact degradation over wash cycles, and/or rough handling by users.

Where a device like a battery must be connected via detachable connections, washable snap button connectors can be utilized so that the garment can be washed. The electronics of the controller can be supported by a waterproof covering that either remains integral with the garment and can thus be washed with the garment, or the controller can be detached from the garment, e.g., removed from an open pocket.

First Example Wearable Device—Inframammary or Abdominal Belt/Band

Referring to drawings and in particular to FIG. 1A, a schematic diagram illustrates a wearable, non-invasive iEF therapy device 100. The wearable, non-invasive iEF therapy device of FIG. 1A is suitable for treating solid masses, e.g., tumors, cancer, etc., of the wearer, and comprises a garment 102 having a belt (or band) form factor. In this regard, the garment 102 of FIG. 1A is presented for clarity of explanation where the type of garment, and the garment shape is shown by way of illustration and not by way of limitation. In this regard, the device 100 of FIG. 1A can optionally include any one or more features described previously (e.g., in the Introduction and/or General Approach for At-Home Garment section), or that are disclosed in any later implementations or FIGURES herein, in any combination.

The wearable garment 102 integrates a coil or coils 104 that deliver the iEF treatment. In this regard, the wearable garment 102 can function to position the coils 104 relative to a patient such that the induced fields target or otherwise affect a mass, e.g., tumor, cancer, etc., within the patient. In other configurations, the wearable garment 102 can function to position the coils 104 relative to a patient such that the induced fields are non-targeted, yet still affect a mass, e.g., tumor, cancer, etc., within the patient.

In the form-factor of a belt or band as illustrated, the wearable garment 102 wraps around the patient. Correspondingly, the coils 104 also surround the patient by encircling around the belt/band. In other embodiments, the wearable garment 102 may wrap around a portion or all of the patient, but the coils 104 are one sided or otherwise do not completely surround or wrap around the patient. In this regard, the patient physiology, specific mass of the patient being addressed, and other factors may affect the wearable garment shape and/or coil configuration.

In an example implementation, the device 100 can be designed to include a washable, wearable garment 102 implemented as a band that is to be worn around the inframammary line just below the breasts to treat breast cancer. The garment 102 comprises a conductive coil 104 integrated into a fabric of the wearable garment 102, e.g., the coil 104 is wound and is attached circumferentially to the band of the device 100. Thus, in some embodiments, the windings of the coil 104 may not be visible as they are integral with the material of the wearable garment.

In an example implementation, the band can have a diameter of 29.11 centimeters (cm) (about 74 inches). This corresponds to a 91.45 cm (36-inch) circumference). The band 102 can be 4.32 cm (about 1.7 in) high, where 2.92 cm (1.15 in) of this height is covered by the coil windings). Moreover, the band 102 can be 1.65 mm (0.065 in) thick.

Moreover, in an example configuration, the coil 104 comprises 103 turns of 32 AWG insulated wire in a single layer sandwiched within the material of the band, and has a DC resistance of 53Ω (Ohms). In other embodiments, the band can take on other dimensions, e.g., ~1 in. (2.54 cm) high, or any other desired dimension suitable to hold the corresponding coil 104, e.g., where the shape/dimensions are likely to be dictated by the individual receiving the treatment.

The device 100 of FIG. 1A is schematically illustrated as being coupled to a controller 106. In practical applications, the controller 106 can be integrated into the wearable garment 102, or the controller 106 can be an external device, e.g., worn on a belt clip, pocket, etc. The controller 106 is further schematically illustrated as being connected to the coil 104 via cabling 108. The cabling 108 can hardwire to the coil 104, or the cabling 108 can couple to the coil 104 via connectors. The cabling 108 can carry one or more discrete conductors, e.g., depending upon the number of coils. Regardless, in use, a first connector 110A is physically and electrically connected to a second connector 110B. Here, the first connector 110A is physically and electrically connected to the coil 104, and the second connector 110B is physically and electrically connected to the controller 106. Additional wires and optional connectors are utilized as necessary to couple the coil 104 to the controller 106, where the precise number of wires/connectors will depend upon the specific features implemented into the controller 106, examples of which are set out in greater detail herein.

Second Example Wearable Device—Inframammary or Abdominal Belt/Band

Figure 1B:
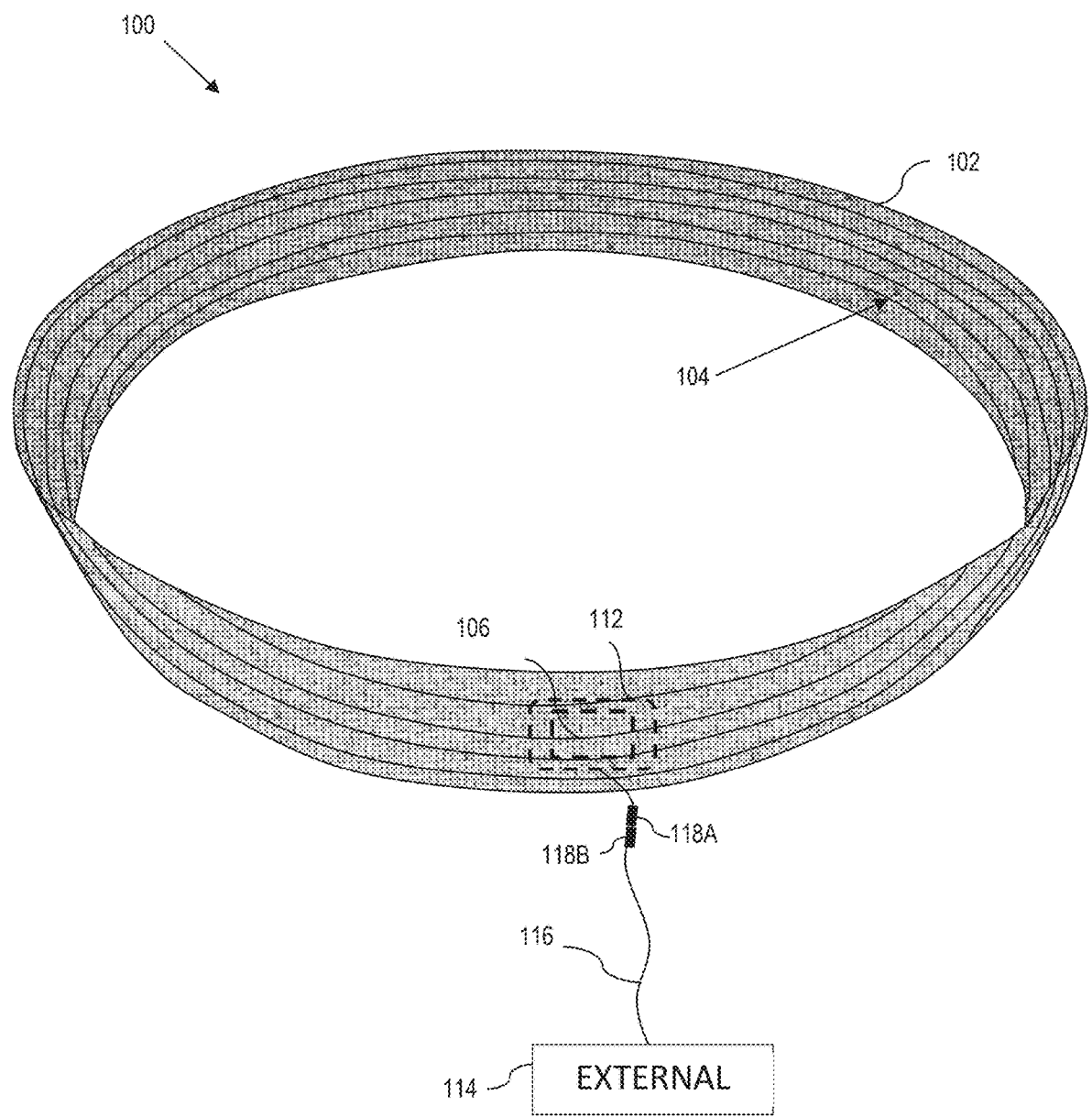
FIG. 1B is a schematic diagram of a wearable non-invasive iEF therapy device for treating solid tumors implemented as a belt, according to further aspects herein.

Referring to drawings and in particular, to FIG. 1B, a schematic diagram illustrates a wearable, non-invasive iEF therapy device 100. The wearable, non-invasive iEF therapy device of FIG. 1B is also suitable for treating solid masses, e.g., tumors, cancer, etc., of the wearer, and comprises a garment 102 having a belt (or band) form factor. In this regard, the garment 102 of FIG. 1B is presented for clarity of explanation where the type of garment, and the garment shape is shown by way of illustration and not by way of limitation. Moreover, the device 100 of FIG. 1B is analogous to the device 100 of FIG. 1A. Thus, the Introduction, the General Approach for At-Home Garment section, features that are disclosed in any later implementations or FIGURES herein, as well as the entire disclosure of FIG. 1A are incorporated into the discussion of FIG. 1B where like parts include like reference numerals and are thus analogous, except where specifically noted.

In FIG. 1B, the wearable garment 102 includes a coil 104 as described more fully herein. The garment 102 also includes a pocket 112, into which the controller 106 is mounted. This allows the controller 106 to be permanently electrically connected to the coil 104, or the controller 106 can be connected to the coil 104 via physical electrical cabling and optional connectors.

The device 100 of FIG. 1B is schematically illustrated as being coupled to an external device 114. In practical applications, the external device 114 can be a battery and/or a battery charging device (e.g., where a battery is integrated into the controller 106). The external device 114 can also optionally include a communication device (e.g., wireless transceiver), Bluetooth device, data collection device, etc., such as where a corresponding device is not included in the controller 106.

The external device 114 is further schematically illustrated as being connected to the controller 106 in the pocket 112 via cabling 116. The cabling 116 can hardwire to the controller 106, or the cabling 116 can couple to the controller 106 via a first connector 118A physically and electrically connected to a second connector 118B. Here, the first connector 118A is physically and electrically connected to the controller 106, and the second connector 118B is physically and electrically connected to the external device 114.

In this regard, the device 100 of FIG. 1B can incorporate any one or more features previously discussed herein, or that are disclosed in any later implementations or FIGURES herein.

Third Example Wearable Device—Scarf

Figure 1C:
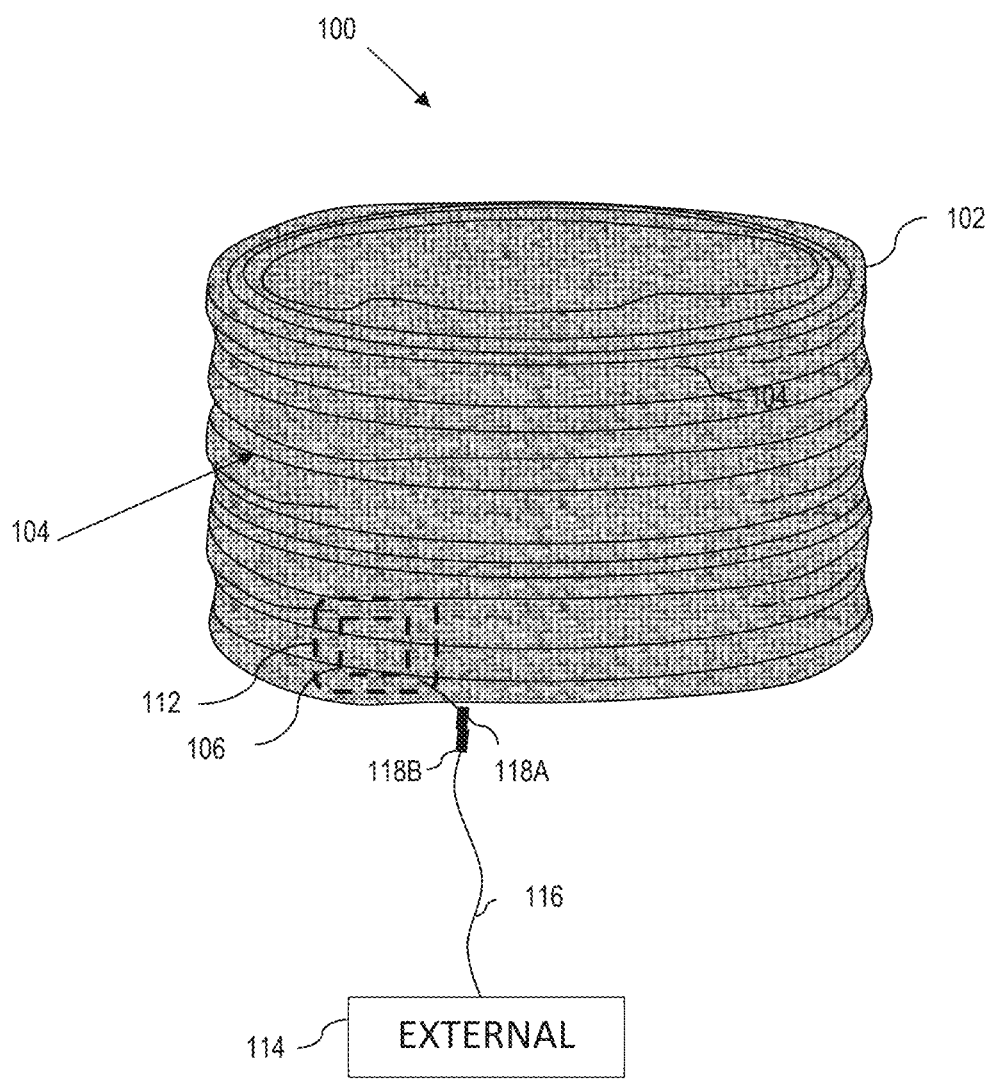
FIG. 1C is a schematic diagram of a wearable non-invasive iEF therapy device for treating solid tumors implemented as a scarf, according to further aspects herein.

Referring to drawings and in particular to FIG. 1C, a schematic diagram illustrates a wearable, non-invasive iEF therapy device 100. The wearable, non-invasive iEF therapy device of FIG. 1C is also suitable for treating solid masses, e.g., tumors, cancer, etc., of the wearer, and comprises a garment 102 having a scarf form factor, (e.g., a tube scarf as illustrated), which can be worn around a patient's neck.

In this regard, the garment 102 of FIG. 1C is presented for clarity of explanation where the type of garment, and the garment shape is shown by way of illustration and not by way of limitation. Moreover, the device 100 of FIG. 1C is analogous to the device 100 of FIG. 1A and/or the device 100 of FIG. 1B, and thus the Introduction, the General Approach for At-Home Garment section, the entire disclosure of FIG. 1A and the entire disclosure of FIG. 1B are incorporated into the discussion of FIG. 1C where like parts include like reference numerals and are thus analogous, except where specifically noted.

In particular, instead of wearing the garment 102 like a band (FIG. 1A, FIG. 1B), the garment 102 of FIG. 1C is worn around the neck as a loose fitting scarf. Otherwise, the device 100 of FIG. 1C can include any combination of features from any one or more of the preceding figures and/or from any later implementations or FIGURES herein.

Notably, the scarf of FIG. 1C is particularly well suited for using a conductive thread to form the coil 104 as described more fully herein. Moreover, as illustrated, the coil 106 wraps around the scarf. This allows the coil 104 to stretch with the scarf to fit over the patient's head, then resume a normal shape during operation when the scarf is placed around the neck of the patient. Here, the coil 104 surrounds the neck of the patient.

In this regard, the scarf is illustrated as having the controller 106 integral to the scarf (e.g., positioned within a pocket 112), where the controller 106 can optionally connect to an external device 114 (e.g., a battery, charger, etc.) via an optional cable 116 and corresponding connectors 118A, 118B.

A scarf of the type illustrated (e.g., tube as compared to an elongate rectangle), simplifies how the scarf is worn. iEFs are forgiving enough that the coil 104 only needs to be in the vicinity of the neck and vagus (or other) nerves (which go down both sides of the neck directly from the brain). Thus, a tube scarf limits the variations in coil electrical properties and keeps operating parameter ranges within manageable limits of the controller 106. That said, aspects herein are not limited to tube style scarfs.

Fourth Example Wearable Device—Bra

Figure 1D:
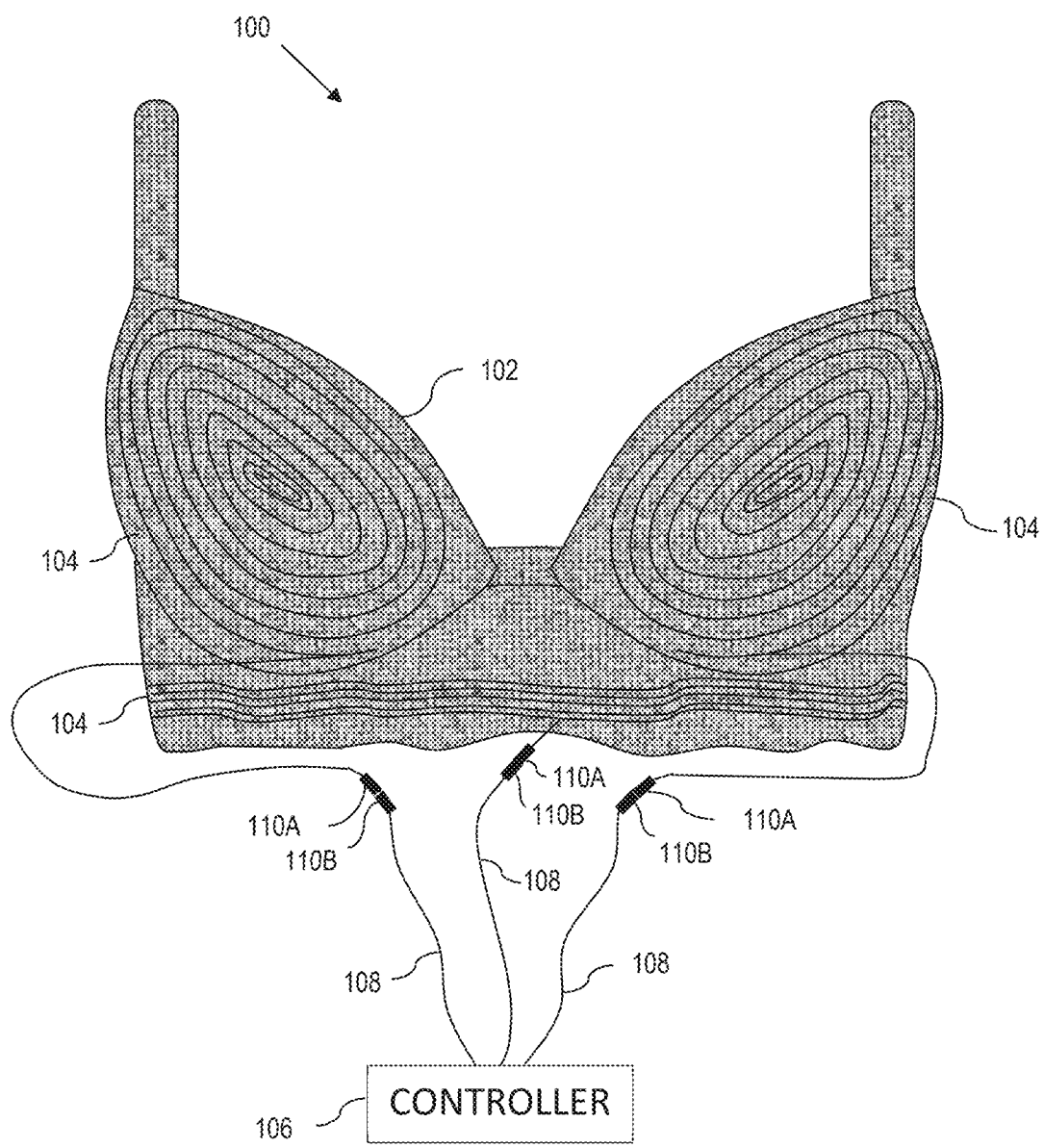
FIG. 1D is a schematic diagram of a wearable non-invasive iEF therapy device for treating solid tumors implemented as a bra, according to further aspects herein.

Referring to drawings and in particular to FIG. 1D, a schematic diagram illustrates a wearable, non-invasive iEF therapy device 100. The wearable, non-invasive iEF therapy device of FIG. 1D is also suitable for treating solid masses, e.g., tumors, cancer, etc., of the wearer, and comprises a garment 102 having a bra form factor. In this regard, the garment 102 of FIG. 1D is presented for clarity of explanation where the type of garment, and the garment shape is shown by way of illustration and not by way of limitation. Moreover, the device 100 of FIG. 1D is analogous to the device 100 of FIG. 1A, the device 100 of FIG. 1B, the device 100 of FIG. 1C, combinations thereof, etc., and thus the Introduction, the General Approach for At-Home Garment section the entire disclosures of FIG. 1A, FIG. 1B and FIG. 1C are incorporated into the discussion of FIG. 1D where like parts include like reference numerals and are thus analogous, except where specifically noted.

In particular, instead of wearing the garment 102 like a band (FIG. 1A, FIG. 1B), or scarf (FIG. 1C), the garment 102 of FIG. 1D is a bra, and is thus suited to treat cancers generally, and is particularly well suited to address breast cancer. Otherwise, the device 100 of FIG. 1D can include any combination of features from any one or more of the preceding figures and/or from any later implementations or FIGURES herein.

In particular, in FIG. 1D, the bra includes a coil 104 for each breast. Each coil 104 forms a structure comprising a spirally wound wire and thus does not wrap around the torso of the patient. Rather, each coil 104 is positioned proximate to an anterior of the patient. By way of example, a wire, or flexible circuit technology is embedded within the fabric or the fabric itself could be fabricated with insulated conducting thread, as described more fully herein.

In this example, the controller 106 includes one or more coil drivers for driving each coil 104. In this regard, the bra illustrated as having the controller 106 external to the bra, where the controller 106 can optionally connect to each coil 104 via an optional cable 108 and corresponding connectors 110A, 110B.

In practical applications, a controller 106 includes a signal generator that applies the driving signals and can be miniaturized so as to be seamlessly incorporated into the wearable device analogous to that described above. As illustrated, the wearable device, e.g., bra is suitable for delivering iEF therapy where the electromagnetic coil is anterior to the body and on the cup of the bra. This realization shows how one-sided (with respect to the human anatomy) delivery of iEF therapy could be accomplished.

In addition to, or in lieu of the coils 104 proximate the breast, the bra can optionally include a coil 104 that wraps around the torso (e.g., in an inframammary or abdominal belt/band) just below the inframammary line, e.g., in a manner analogous to that described with reference to FIG. 1A and/or FIG. 1B. Here, a coil 104 couples to the controller 106, e.g., via an optional cable 108 and corresponding connectors 110A, 110B.

Thus, for sake of example, this implementation demonstrates that a garment 102 can include one or more coils 104, each coil 104 potentially a different size, orientation and/or configuration. The controller 106 correspondingly scales based upon the number of coils 104.

Fifth Example Wearable Device—Camisole or Shirt

Figure 1E:
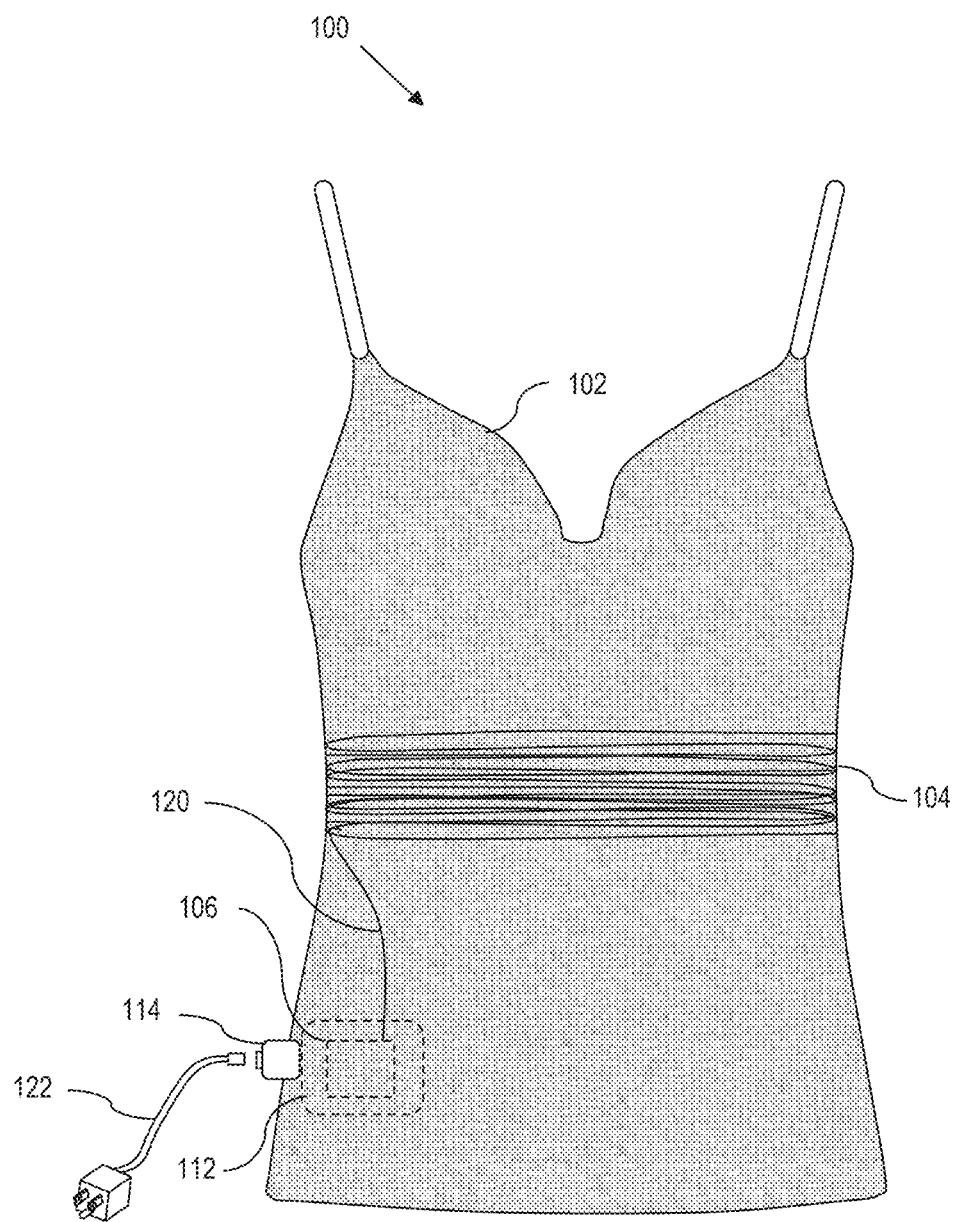
FIG. 1E is a schematic diagram of a wearable non-invasive iEF therapy device for treating solid tumors implemented as a camisole, tee-shirt, etc., according to further aspects herein.

Referring to drawings and in particular to FIG. 1E, a schematic diagram illustrates a wearable, non-invasive iEF therapy device 100. The wearable, non-invasive iEF therapy device of FIG. 1E is also suitable for treating solid masses, e.g., tumors, cancer, etc., of the wearer, and comprises a garment 102 having a shirt form factor, e.g., a camisole, a tee-shirt, undershirt, outer shirt, etc. In this regard, the garment 102 of FIG. 1E is presented for clarity of explanation where the type of garment, and the garment shape is shown by way of illustration and not by way of limitation. Moreover, the device 100 of FIG. 1E is analogous to the device 100 of FIG. 1A, the device 100 of FIG. 1B, the device 100 of FIG. 1C, the device 100 of FIG. 1D, combinations thereof, etc. As such, the Introduction, the General Approach for At-Home Garment section, the entire disclosures of FIG. 1A, FIG. 1B, FIG. 1C, and FIG. 1D are incorporated into the discussion of FIG. 1E where like parts include like reference numerals and are thus analogous, except where specifically noted.

In particular, instead of wearing the garment 102 like a band (FIG. 1A, FIG. 1B), or scarf (FIG. 1C), or bra (FIG. 1D), the garment 102 of FIG. 1E is a shirt, e.g., camisole, tee-shirt, undershirt, outer shirt, etc., and is thus suited to treat cancers generally. Otherwise, the device 100 of FIG. 1E can include any combination of features from any one or more of the preceding figures and/or from any later implementations or FIGURES herein.

In particular, in FIG. 1E, the shirt includes a coil 104 that surrounds the shirt, e.g., so as to surround a torso of the patient when the shirt 102 is worn.

In this regard, the shirt is illustrated as having the controller 106 in a pocket 112 of the shirt, where the controller 106 can optionally connect to each coil 104 via an optional connector 120.

As noted more fully herein, the coil 104 can be woven, stitched, or otherwise integrated into the fabric of the shirt so that the coil is integral with the shirt.

As illustrated, the coil 104 electrically connects to the controller 106 via an electrical connection 120, however, the electrical connection 120 can be printed, stitched, a conductive thread, a hard-wired electrical connection, inductively coupled, etc.

Moreover, as illustrated, an external device 114 (e.g., that may contain an enclosed rechargeable battery, such as for patient mobility), is positioned in an external pocket that physically and proximally overlaps with the controller 106. The external device 114 is implemented as the primary power source for the controller 106, delivering power wirelessly to the controller 106 through induction (e.g., via a transmitting power coil located within the external device 114, and a corresponding receiving power coil located within the controller 106). The external device 114 receives its power from the enclosed rechargeable battery, and/or via a power cable 122. The power cable 122 can connect to the external device 114, e.g., via a USB-C connection, or other connection. The power cable 122 also allows for charging of any enclosed battery within the external device 114, while simultaneously powering the controller 106, as applicable.

Controller

Figure 2:
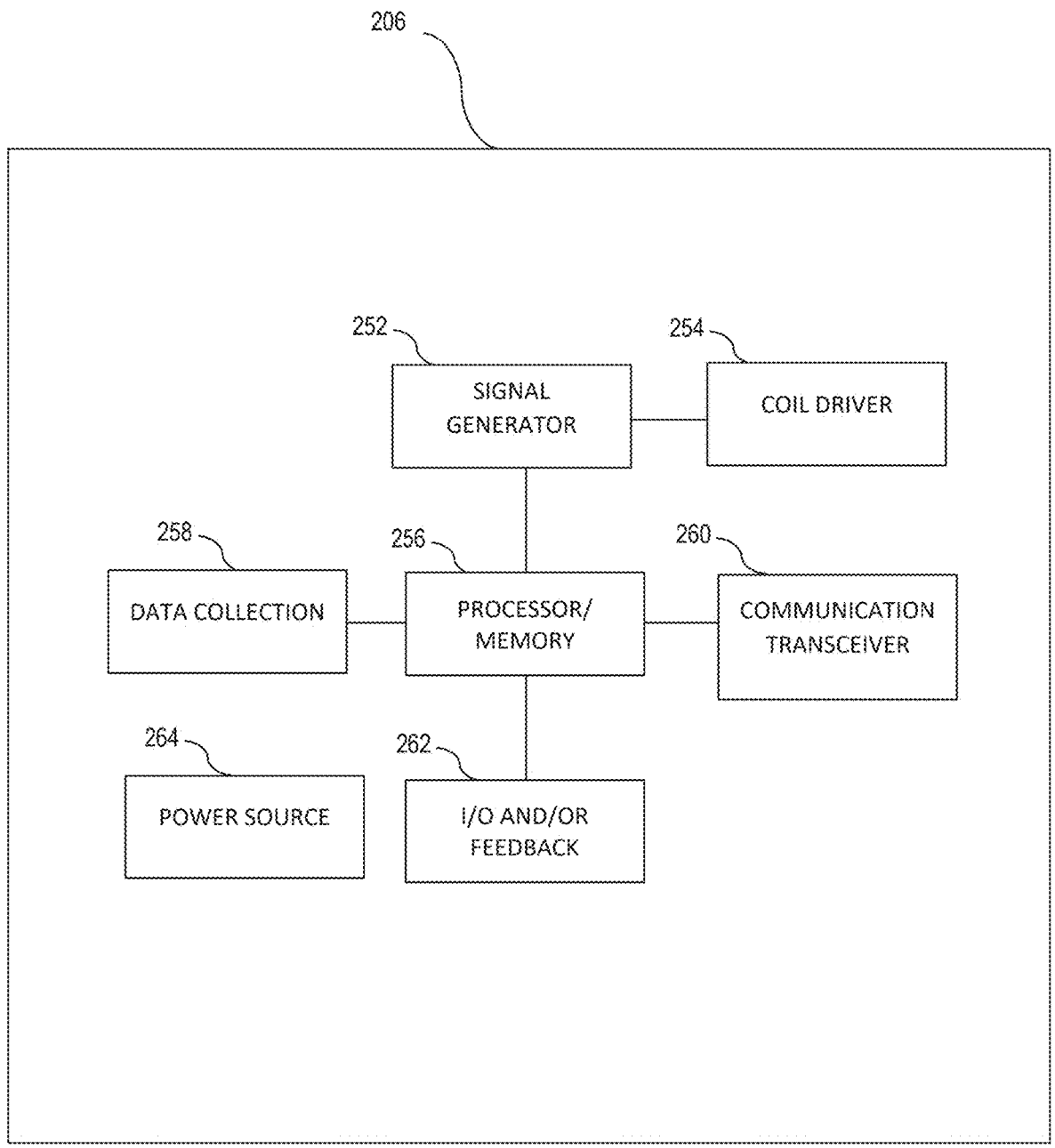
FIG. 2 is a block diagram of an example controller, according to aspects herein.

Referring to FIG. 2, an example controller 206 is illustrated. The example controller 206 can implement the controller 106 of any device 100 previously described.

The illustrated controller 206 includes a signal generator 252 and a coil driver 254. The signal generator 252 generates a waveform that is communicated to the coil (e.g., coil 106, FIG. 1A-FIG. 1E) to generate the iEF. Correspondingly, the coil driver 254 includes the circuitry necessary to condition the output of the signal generator 252 in order to generate the iEF, e.g., by driving a current through the coil 104 (FIG. 1A-FIG. 1E) based upon the waveform output from the signal generator 252. The coil driver 254 can include an amplifier, buffer, output impedance modifier, other circuitry, any combination thereof, etc.

In some advanced configurations, the controller 206 can include an optional processor 256, e.g., coupled to memory. The processor 256 can control various aspects of the device. For instance, the processor 256 may control timing of when the device is on and/or off. The processor 256 may control changing the frequency, waveshape, intensity, or other parameters that affect the iEF. The processor 256 can also control other aspects, examples of which include performing data collection 258 (e.g., data logging of a timestamp, time/duration of iEF treatment, frequency, wave shape, feedback, detectable treatment conditions, etc.).

The processor 256 can also interact with a communication transceiver 260, such as Bluetooth, ultra-wideband, Wi-Fi, USB, or other communication protocol, for exchanging data with an external device such as a computer, server, etc. Such can be used to allow a doctor to modify parameters controlled by the processor 256, such as treatment times, intensities, etc. The communication transceiver 260 can also be used to communicate data, e.g., the logged data, to the external device.

The controller 206 can also include optional input/output (I/O) 262 and/or feedback circuitry. For instance, I/O 262 can include visual, audible or tactile indicators of functioning, user-adjustable controls to affect programming, e.g., of the waveform generator 252, etc. For instance, in a practical application, the device includes an indicator to alert the user that the device is on and functioning properly. A feedback 262 can also be provided for indicating battery charge, low battery warning, etc.

In some embodiments, the I/O 262 can also include a connector to receive power from an external source. Still further, the I/O 262 can include an input to receive programming or updates, an output such as a display or indicator, etc.

Yet further, the feedback 262 can monitor the iEF and provide feedback for changes to the signal generator 252, e.g., based upon changes in tumor/cancer mass. More generally, I/O 262 can facilitate optional feedback, e.g., such as where changes in patient physiology dictate changes in operating parameters, examples of which are described in greater detail herein.

As an example, the feedback received from I/O 262 can include or otherwise interact with an impedance matching network. In an illustrative implementation, a voltage divider can be established where a feedback voltage is ½ of an output drive from an amp, caused by the impedance matching network in series with the coil, e.g., a 50 ohm impedance matching network and a 50 ohm impedance of the coil/garment in series.

Indicator lights and/or display (or a display in a Graphical User Interface of a smartphone app, etc.) can be utilized to show that battery charge and/or that a current is properly flowing through the coil as a form of feedback.

Some embodiments can monitor tiny variations in the current flowing in the circuit with the coil (e.g., see coil 106, FIG. 1A-FIG. 1E). By monitoring such variations over time, e.g., over the duration of the treatment, changes in the electrical characteristics in the mass (e.g., tumor) can be detected, which will affect the applied field. For instance, any induced displacement current or changes in capacitance and impedance in the tissue will cause the distribution and possibly magnitude of the applied B field to change, which in turn will affect the current flow in the coil. This feedback is expected between a coil and the tissue it encloses by virtue of the capacitance and impedance of the tumor-bearing tissue.

Bluetooth can also enable connection to a smart phone App, so that the App can monitor the proper functioning of the device, progress of treatment/therapy, characteristics of the tumor, how long the person is wearing the device, how long the device is off, battery characteristics, and other parameters.

By monitoring coil impedance, e.g., by measuring a voltage across the output of a matching network, an indicator can be derived that represents coil condition. This coil condition can be compared for instance, to a range, threshold, etc. Here, the processor 256 can utilize the communication transceiver 260, I/O 262, or both to send an alert (e.g., to the patient or clinician) that the impedance is out of specification (e.g., out of range, exceeds a threshold, etc.).

Also, the controller 206 can include a built-in power source 264, e.g., a rechargeable battery. Here, the power source 264 couples to any function of the controller 206 that needs to receive power. Also, the I/O 262 can include the necessary connections to recharge and/or supply power to the power source 264.

As noted in greater detail herein, the above features need not be co-located in a single housing. Rather, the components of the controller 206 can be distributed between a location on the garment itself, and an external device, as noted in the various examples of FIG. 1A-FIG. 1E.

The controller 206 can also include other circuitry, e.g., a current limiter built-into the circuit to prevent an accidental runaway current due to an electrical short or some other adverse event.

The controller 206 can also include an RFID chip or store in the memory, an unique identifier for associating the collected data with a garment, patient, etc.

Signal Generator

The waveform utilized to drive the coil is configured to create an iEF that is suitable for treating a solid mass, e.g., tumor, cancer, etc., of the patient. The below discussion can be directed to any of the configurations described previously.

First Example Waveform Configuration

Assume for sake of discussion, that a coil in a band, such as illustrated in FIG. 1A or FIG. 1B (solely for sake of clarity of discussion, and not by way of limitation) has a resonant frequency of 85 kilohertz (kHz). This can be characterized or verified, for instance, by conducting an impedance sweep versus frequency, based upon an internal impedance used for measurement, e.g., 100 k $\Omega$, 20$\Omega$, etc.

Figure 3A:
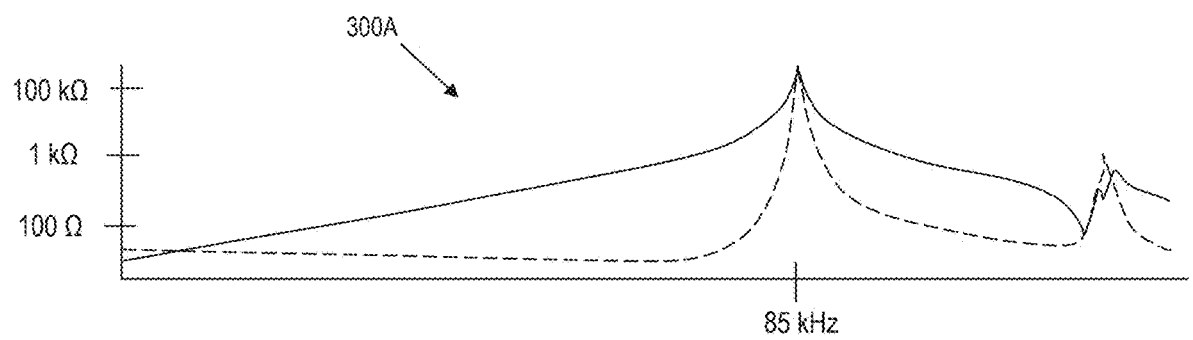
FIG. 3A is an example plot of impedance vs. frequency for an example coil, showing a resonance frequency at approximately 85 kHz.

Referring to FIG. 3A, a plot illustrates a frequency sweep 300A with impedance on the ordinate and frequency on the abscissa at two different values of an internal impedance used for measurement.

Figure 3B:
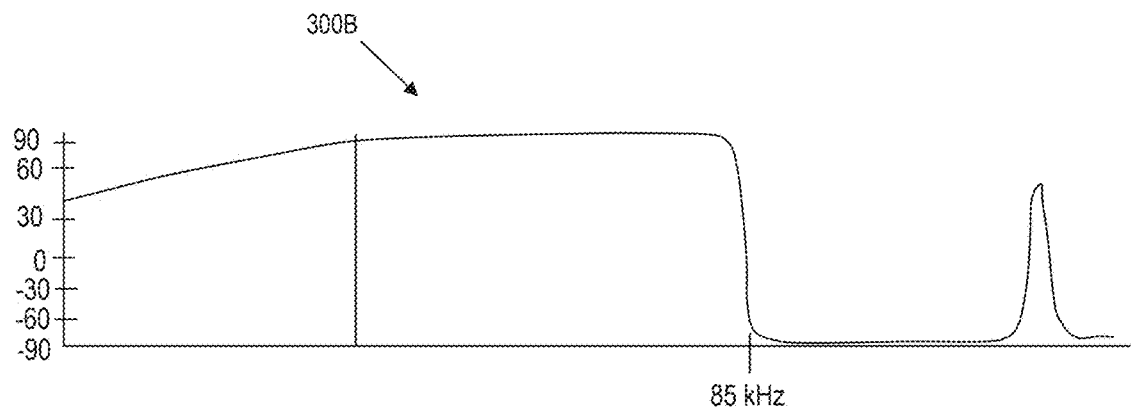
FIG. 3B is an example plot of phase vs. frequency for the example coil of FIG. 3A.

Referring to FIG. 3B, a plot illustrates a frequency sweep 300B that corroborates the results in FIG. 3A. In FIG. 3B, phase is on the ordinate, and frequency is on the abscissa. Note that plotting a frequency dependence of the phase will reveal a sharp drop-off of the phase at the resonant frequency, about 85 kHz in this example.

In an example implementation, assume that based on the above-configuration, an inductance of 6.14 millihenries (mH) was measured. From the resonant frequency and inductance, an approximate intrinsic capacitance is calculated as:

$$C = \frac{1}{4\pi^2 L f_r^2}$$

where C is the capacitance, L is the inductance, and $f_r$ is the resonant frequency. For L=6.14 mH, and $f_r$=85×10$^3$ Hz, the capacitance is 571 picofarads (pF) in this example.

With reference generally to the examples of FIG. 1A-FIG. 1E and FIG. 2, the controller 106, 206 includes a signal generator (252, FIG. 2) that communicably couples to the coil 104 (FIG. 1A-FIG. 1E), e.g., via a coil driver 254 (FIG. 2). For instance, the signal generator 252 can apply a waveform such as a sawtooth shaped alternating voltage (e.g., in a range up to, or exceeding −10 V to +10 V relative to ground) at one or more frequencies, e.g., 1-100 kHz, a frequency in excess of 100 kHz, etc. The sawtooth waveform in an illustrative example, has a rise time of ~ 10 microseconds (μs) and a fall time of ~50 nanoseconds (ns). As another example, the sawtooth waveform can have a fall time of 10 milliseconds or less, and a rise time of 50 nanoseconds or less. The time-varying current produces a time-varying magnetic induction B, which in turn produces an induced electric field (iEF) in the space around the coil 104. For instance, the waveform can comprise a sawtooth shaped alternating voltage having a magnitude of −10 V to +10 V, at 100 kHz.

In general, any voltage waveform with a sharp rise and/or fall will work. In this regard, even a sine wave can work, except a sine wave may require orders of magnitude higher B fields. A triangle wave should also work as well but, again, may require a higher B field compared to a sawtooth. In general, some embodiments require that some part of the waveform has a rapid rise or fall on the order tens to hundreds of nanoseconds.

Figure 4A:
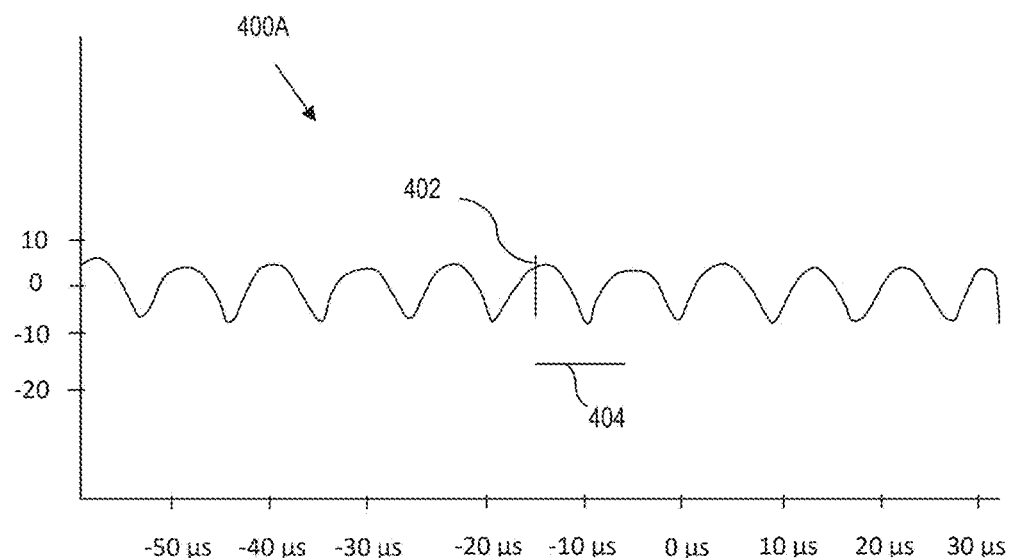
FIG. 4A is an example plot of a measured axial component of magnetic induction at 100 kHz at a radius at the center, r=0, z=0 for the example of FIG. 3A.

Referring generally to FIG. 4A, a measured axial component 400A of magnetic induction $B_z$ at 100 kHz is shown versus time at a radius (at the center, (r=0, z=0).

Figure 4B:
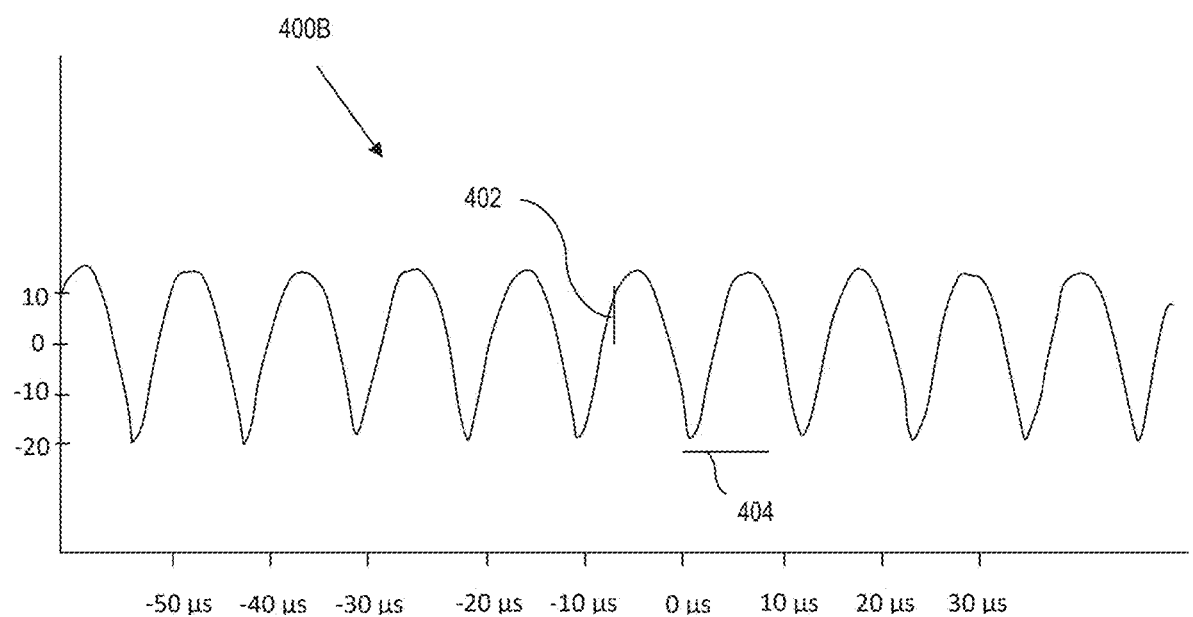
FIG. 4B is an example plot of a measured axial component of magnetic induction at 100 kHz at a radius at the center, r=11 cm, z=0 for the example of FIG. 3A.

Referring generally to FIG. 4B, a measured axial component 400B of magnetic induction $B_z$ at 100 kHz is shown versus time at a radius near the inner edge of an example coil (r=11 cm, z=0)).

Referring to FIG. 4A and FIG. 4B generally, the vertical bar 402 represents 1 μT and the horizontal bar 404 represents 10 μs.

Figure 4C:
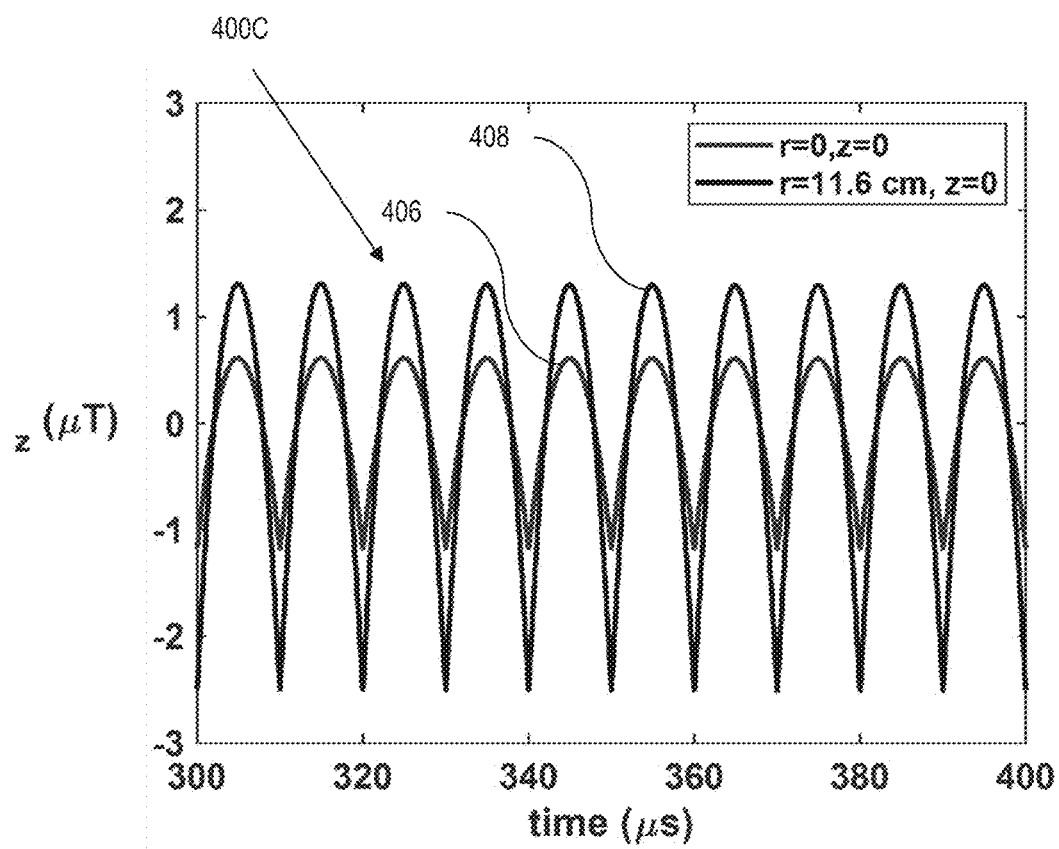
FIG. 4C is an example plot illustrating calculated values of the axial component of magnetic induction for the coil resistance, inductance, and capacitance, as determined from the frequency sweep shown in FIG. 3A.

Referring to FIG. 4C, plot 400C illustrates example data plotting calculated magnetic induction $B_z$ on the ordinate axis and time in microseconds on the abscissa. The plot shows illustrative data for an example implementation of a device 100 (FIG. 1A-FIG. 1E), where the calculated values of the axial component of magnetic induction for the coil resistance, inductance, and capacitance (as determined from the frequency sweep shown in FIG. 3A). The curve 406 corresponds to the location of the measurement illustrated in FIG. 4A, and the curve 408 shows calculated values at r=11.6 cm and z=0, close to the location where the measurement was taken in FIG. 4B.

The plots in FIG. 4A, FIG. 4B, and FIG. 4C demonstrate measured and calculated values of the axial component of magnetic induction versus time at (r=0, z=0) and at (r=11.6 cm, z=0) for an example device (53 Ω, 6 mH, 571 pF). The calculated values are in good agreement with measurements (~1.3 μTpp measured at r=0 versus ~1.5 μTpp calculated, and ~2.5 μTpp measured at r=11 cm versus ~4 μTpp calculated at r=11.6 cm). These calculations and measurements serve to confirm that the electromagnetic fields used to successfully hinder primary triple-negative breast tumor growth and pulmonary metastases in laboratory mice have been reproduced at human anatomical scales by the device (e.g., the device 100, FIG. 1A-FIG. 1E).

Optimize dB/dt

Most coils are designed to operate at a resonant frequency as that is optimum for driving a maximum current through a coil with the aim of producing the highest B field possible. However, in some embodiments, the device herein delivers iEF therapy, and thus must produce the highest possible iEF which, by Faraday's law, is related to how quickly the magnetic induction changes with time. To produce the largest dB/dt (and hence the highest iEF), it is necessary to have the highest B field possible that changes as quickly as possible in time.

A coil operating at resonance would produce the highest B field but would, at that instant, only be slowly varying in time so that the maximum iEF would occur off-resonance (i.e., not at 85 kHz in the case of the example device discussed above, which operates at 100 kHz) and at a time where the B field is not maximum.

Figure 5:
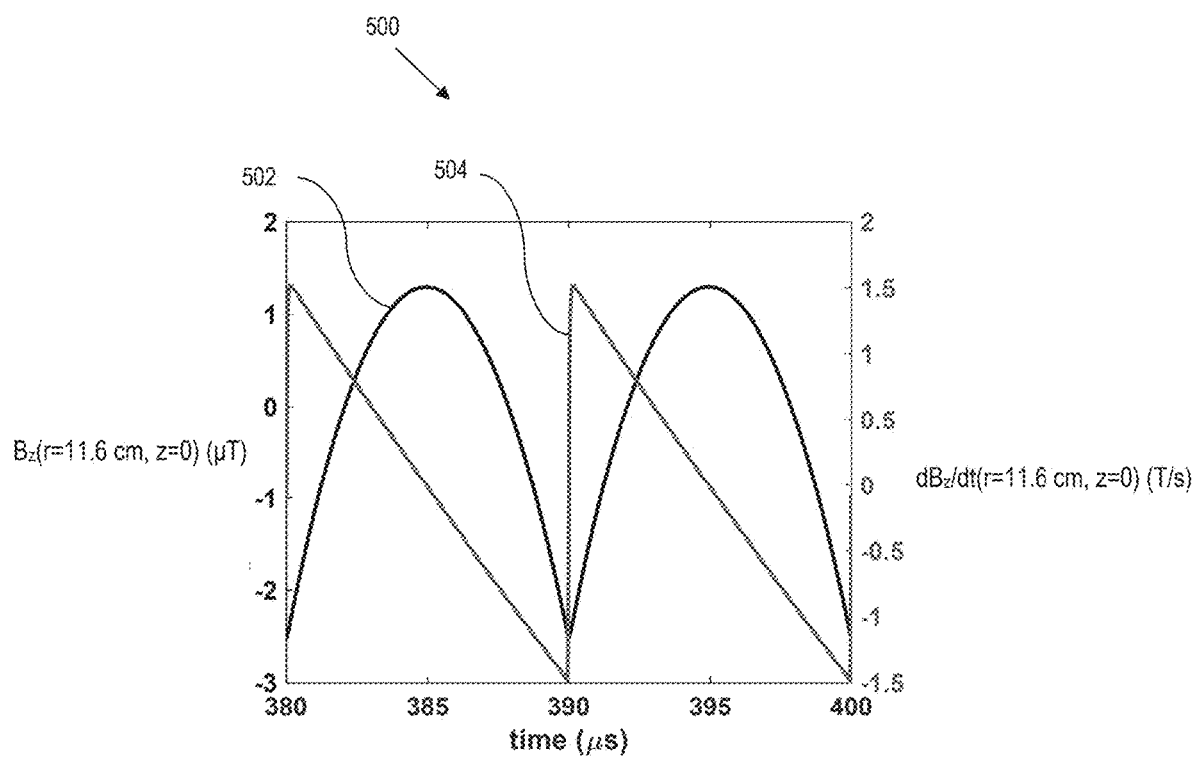
FIG. 5 is an example plot illustrating calculated values of an axial component of magnetic induction $B_z$ versus time at z=0 (axial center of the device) and r=11.6 cm, more than a centimeter inside the inner edge of the example device.

Referring to FIG. 5, a plot 500 illustrates example calculations where magnetic induction $B_z$ is on the left ordinate axis, dB/dt is on the right ordinate axis, and time in microseconds on the abscissa.

Curve 502 illustrates calculated values of the axial component of magnetic induction $B_z$ versus time at z=0 (axial center of the device) and r=11.6 cm (more than a centimeter inside the inner edge of the example device).

Curve 504 illustrates calculated values of $dB_z/dt$ versus time at z=0 (axial center of the device) and r=11.6 cm (more than a centimeter inside the inner edge of the device). At the maximum positive value of $B_z$, $dB_z/dt=0$, and the locations of the minima for $B_z$ and maxima/minima of $dB_z/dt$ occur at different times though only slightly temporally apart from $B_z$. The asymmetry in time of the driving sawtooth waveform for V(t) is thus illustrated.

Figure 6:
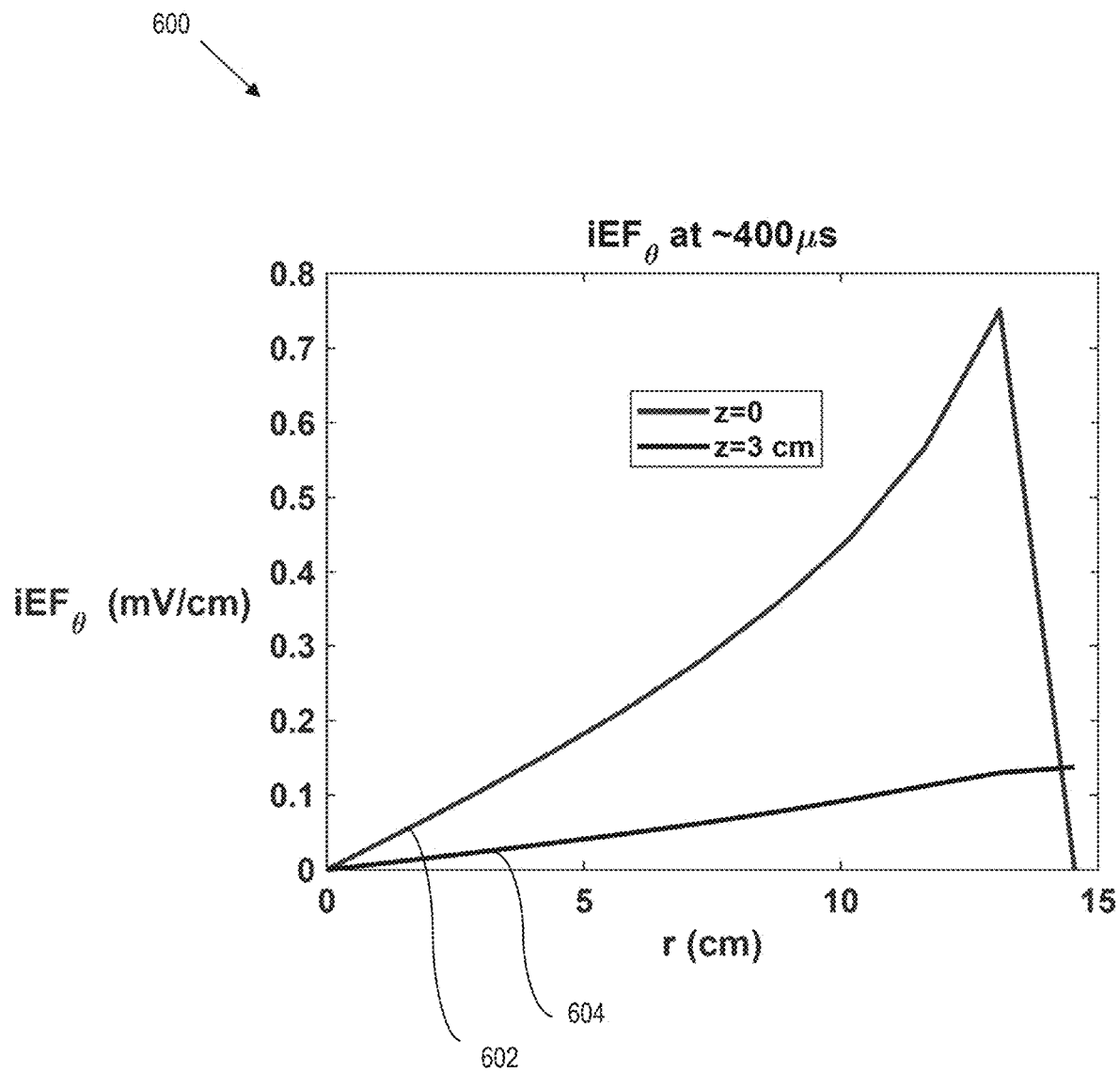
FIG. 6 is an example plot that illustrates the azimuthal component of the iEF ($E_q$), showing the magnitude of iEFs produced at human anatomical dimensions.

FIG. 6 shows an example plot 600 that shows the azimuthal component of the iEF ($E_q$), showing the magnitude of iEFs produced at human anatomical dimensions in the example device, e.g., the device 100 of FIG. 1A and/or FIG. 1B.

FIG. 6 illustrates a calculated relevant (i.e. for the characteristics of the device 100) azimuthal component $E_q$ of the iEF versus radial location at two different axial locations z=0 (axial center 602 of the device) and at z=3 cm (beyond the edge 604 of the device and above a corresponding inframammary line when worn by a patient). The magnitudes of the iEF produced by the device 100, are comparable to studies that yielded favorable results by slowing primary tumor growth and hindering pulmonary metastasis.

Example Garment with Conductive Threads

Figure 7:
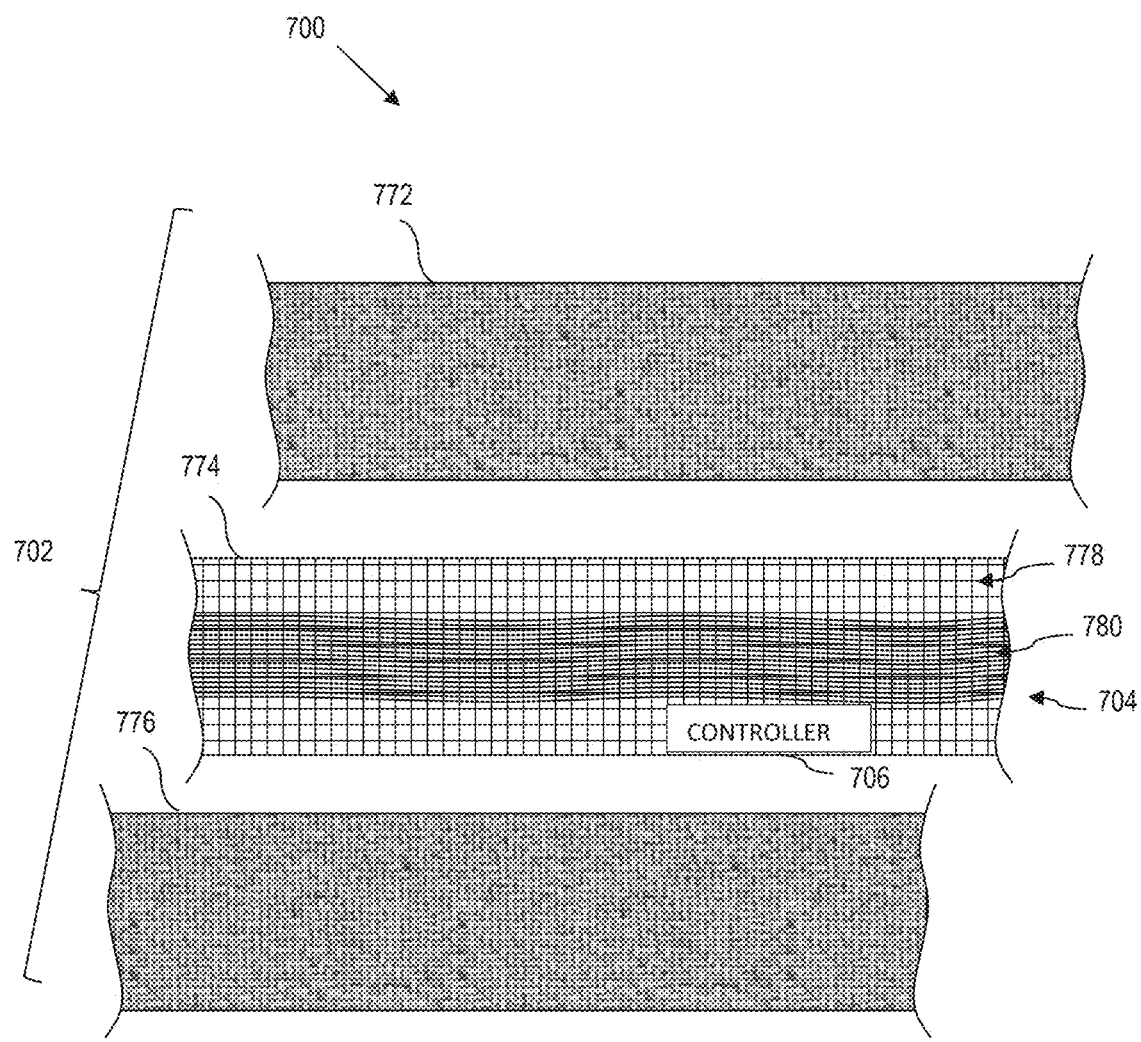
FIG. 7 is an example inframammary or abdominal belt/band assembly that includes an integral coil wound using conductive thread.

Referring to FIG. 7, yet another example is illustrated. A device 700 defines a garment 702 implemented as an inframammary or abdominal belt/band analogous to that described with reference to FIG. 1A or FIG. 1B. As such, even if not expressly described in this section, the garment 702 can include any previous features alone or in combination, as described more fully herein.

The garment 702 includes a first layer 772, a second layer 774, and a third layer 776. The second layer 774 is sandwiched between the first layer 772 and the third layer 776, e.g., via glue, lamination, stitching, sewing, or using any suitable technique to form an integral band.

The first layer 772 and the third layer 776 can be the same or different material. However, these layers are illustrated as cloth layers that are washable fabrics.

The second layer 774 comprises a scaffolding material, e.g., to provide structural support for the coil 704. That is, a scaffold sheeting 778 forms a grid of open cells using a thin, strong cord material, e.g., nylon, polyethylene, etc. A conductive thread 780 is wound and attached circumferentially to the scaffold sheeting 778. For instance, the conductive thread 780 can be woven through the grid pattern of the scaffold sheeting 778 to form a coil (analogous to the coil 104, FIG. 1A-FIG. 1E). As noted more fully herein, the conductive thread can also/alternatively be sewn, woven, knitted, printed, or otherwise integrated into the garment as described more fully herein.

The garment 702 thus includes a coil 704 of anatomical dimensions (analogous for example, to the coil 104, FIG. 1A, FIG. 1B), where the coil 704 is made from conductive thread 780. As an example, the conductive thread 780 used to wind the coil 704 may comprise a plurality, e.g., 5-25, conducting wires wound in an intertwined and braided manner with one or more strengthening fibers, e.g., para-aramid fibers, for structural support. Each conducting wire may be individually insulated, which provides further unique advantages, described more fully herein. An example conductive thread 780 can have a linear resistance, for instance, of 0.28 Ω/ft.

The coil 704 wound from this conductive thread 780 is cloth-like and sewable. As such, the garment 702 can be constructed with an integral coil 704, where the garment 702 is washable. Moreover, the conductive thread 780 of the coil 704 facilitate an ability to easily solder the coil 704 to electrical connectors, associated electronics, and power sources. Moreover, the intertwined and braided wire strands allow the coil 704 to stretch and return to shape in a manner consistent with the ability of fabric layers (first layer 772 and third layer 776) to stretch, conform, and return to shape. This allows the garment 702 to be easily donned by the patient, as the coil 704 can stretch and conform to the patient as the patient slips into the belt and positions the belt for therapy. Alternatively, the conductive thread 780 may be woven into the fabric, e.g., fabric layer 772, so as to not require any additional layers.

For sake of example, assume the coil winding has a 29.11 cm diameter, corresponding to a 91.45 cm (36 in.) circumference, and is 2.54 cm (1 inch) high, 1.143 mm (0.045 in.) thick. Moreover, assume the coil is wound with 61 turns of the conductive thread 760 woven into the scaffold sheeting 708, and has a DC resistance of 50.92Ω (including the resistance of two 15/24 cm (6-inch) leads.

Although this example is provided in the context of a belt, the same assembly techniques can be utilized with any garment configuration, including any of those other examples set out herein (e.g., scarf, bra, camisole, etc.).

Figure 8A:
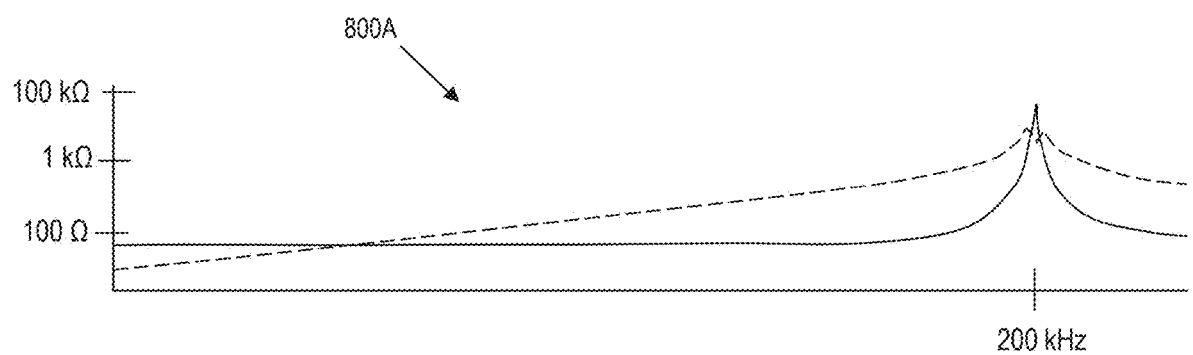
FIG. 8A is an example plot of impedance vs. frequency for an example coil, showing a resonance frequency at approximately 200 kHz.

Referring to FIG. 8A, a plot illustrates a frequency sweep 800A with impedance on the ordinate and frequency on the abscissa at two different values of an internal impedance used for measurement. As the sweep 800A illustrates, this example coil 704 (FIG. 7) exhibits a resonant frequency of ~200 kHz, and had a measured inductance of 2.137 mH, which compares well to a theoretical inductance computed at a value of 2.2 mH.

Figure 8B:
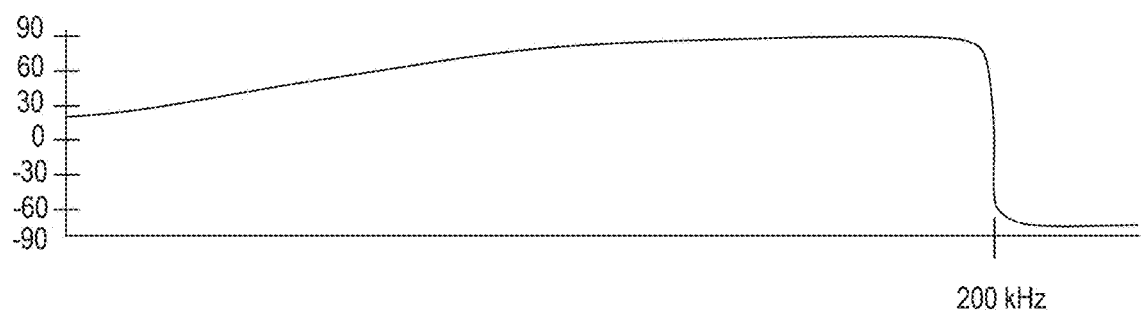
FIG. 8B is an example plot of phase vs. frequency for the example coil of FIG. 8A.

Referring to FIG. 8B, a plot illustrates a frequency sweep 800B that corroborates the results in FIG. 8A. In FIG. 8B, phase is on the ordinate, and frequency is on the abscissa. Note that plotting a frequency dependence of the phase will reveal a sharp drop-off of the phase at the resonant frequency, about 200 kHz in this example.

From the resonant frequency and inductance, an approximate capacitance can be calculated:

$$C = \frac{1}{4\pi^2 L f_r^2}$$

where C is the capacitance, L is the inductance, and $f_r$ is the resonant frequency. For L=2.14 mH, and $f_r$=2×105 Hz, the capacitance is ~296 pF.

Referring back to FIG. 7, the coil 704 is coupled to a controller 706 (analogous to the controller 106, FIG. 1A, FIG. 1B, etc.). That is, the controller 706 can be integrated into the garment, or the controller 706 can be external to the garment. Regardless, the controller 706 can include a signal generator and driver that drives a current through the coil 704 by applying a waveform as described more fully herein. For instance, the waveform can comprise a sawtooth shaped alternating voltage, (e.g., fluctuating between −10 V to +10 V) at a non-resonance frequency, e.g., 100 kHz.

Figure 9A:
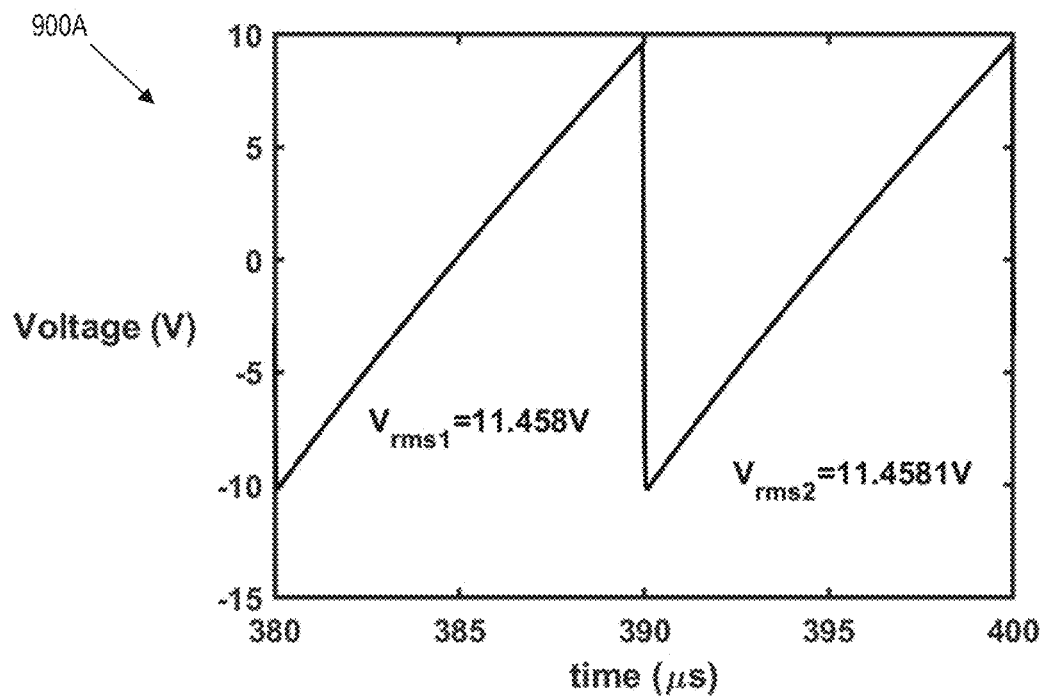
FIG. 9A is an example plot of a sawtooth waveform used to drive the coil of FIG. 7.

Referring to FIG. 9A, a plot 900A illustrates a sawtooth waveform that has a rise time of ~ 10 μs and a fall time of ~ 50 ns that is used to drive the coil 704 (FIG. 7).

Figure 9B:
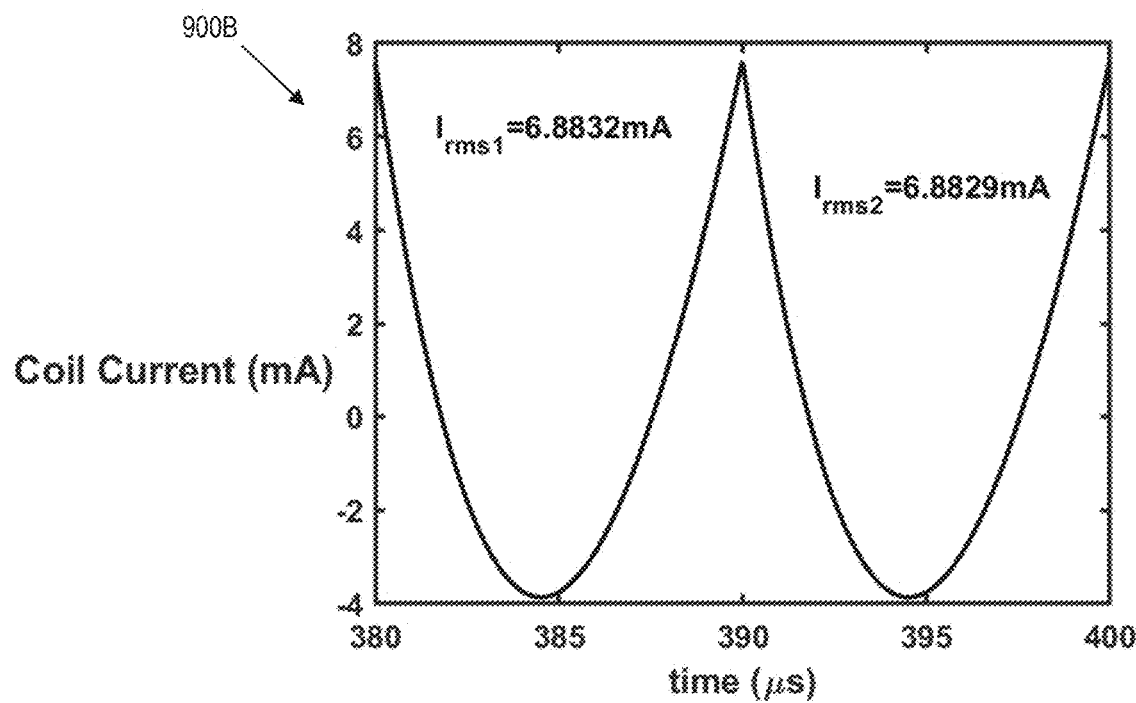
FIG. 9B is a plot of a calculated current through the coil of FIG. 7.

Referring to FIG. 9B, a plot 900B illustrates the current through the coil 704 (FIG. 7) responsive to the drive waveform in the plot 900A (FIG. 9A). Note that the current produces a time-varying magnetic induction B, which in turn produced an induced electric field (iEF) in the space around the coil.

Figure 9C:
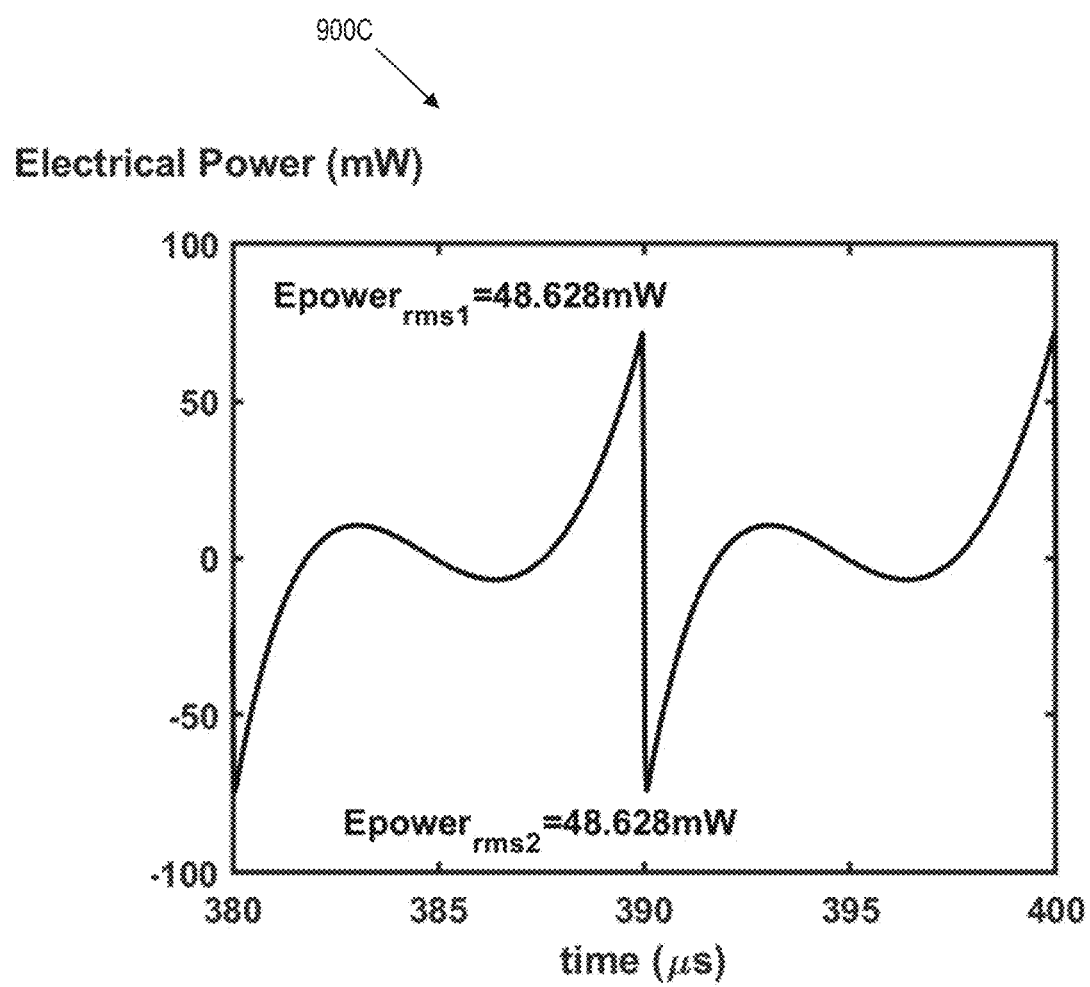
FIG. 9C is a plot of the instantaneous power of the waveform of FIG. 9A coupled to the coil of FIG. 7.

FIG. 9C illustrates a plot 900C that illustrates the instantaneous power, calculated as the instantaneous product of the voltage and current. Two different powers are calculated via the root mean square values, and both predict a consumption (dissipated electrical power) of ~ 49 mW for this example.

Figure 10A:
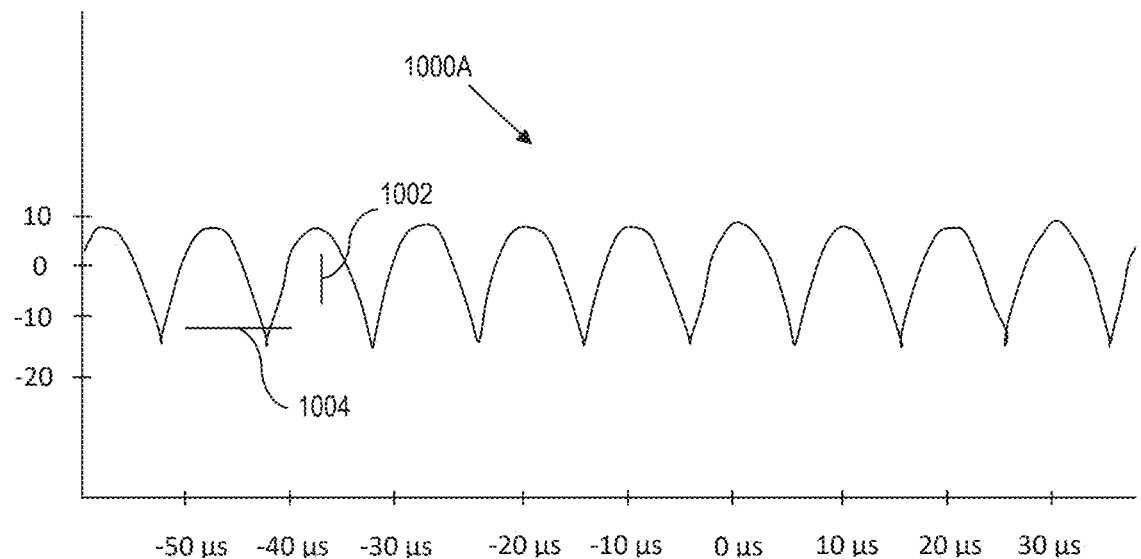
FIG. 10A is an example plot that illustrates measured values of the axial component of magnetic induction $B_z$ at the center of an example coil.

Referring to FIG. 10A, a plot 1000A illustrate the measured axial component of magnetic induction $B_z$ at 100 kHz shown versus time at the center, (r=0, z=0) of the coil 704 (FIG. 7). The vertical bar 1002 represents 1 μT and the horizontal bar 1004 is 10 μs.

Figure 10B:
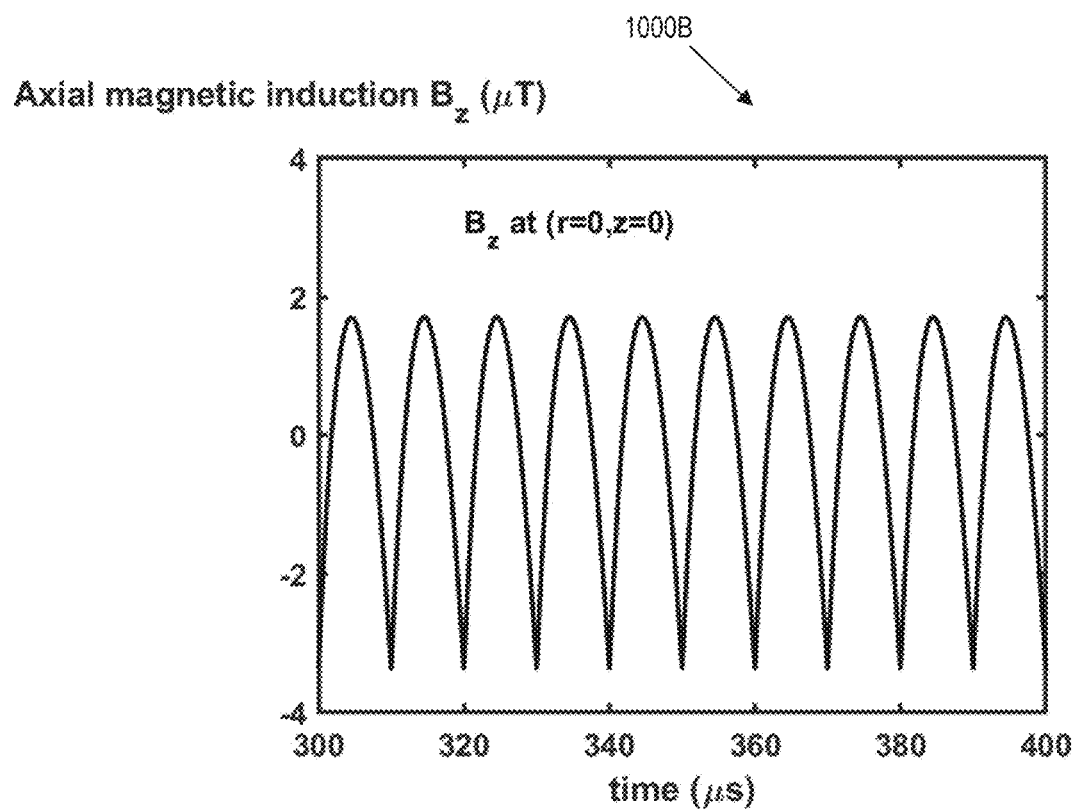
FIG. 10B is an example plot that illustrates calculated values of $B_z$ at the center of an example coil (r=0, z=0) versus time.

Referring to FIG. 10B, a plot 1000B illustrates an example of calculated values of $B_z$ at the center of the coil 704 (FIG. 7) (r=0, z=0) versus time. The predicted peak-to-peak value of between ~ 4-5 μT overestimate measured value of ~ 2.5 μT.

Figure 11A:
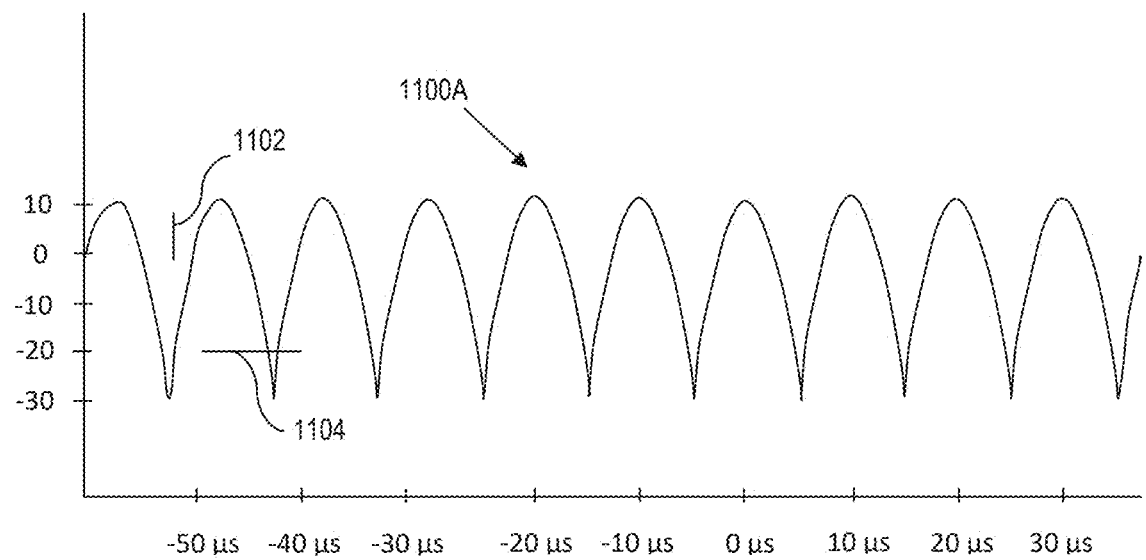
FIG. 11A is an example plot that illustrates measured values of the axial component of magnetic induction $B_z$ at r=13.56 cm, z=0, 1 cm away from the inner edge of an example coil.

Referring to FIG. 11A, an example plot 1100A illustrates the axial component of magnetic induction, $B_z$, 1 cm from the inside edge of the coil 704 (FIG. 7) at r=13.56 cm, z=0, versus time. The vertical bar 1102 represent 1 μT and the horizontal bar 1104 represents 10 μs.

Figure 11B:
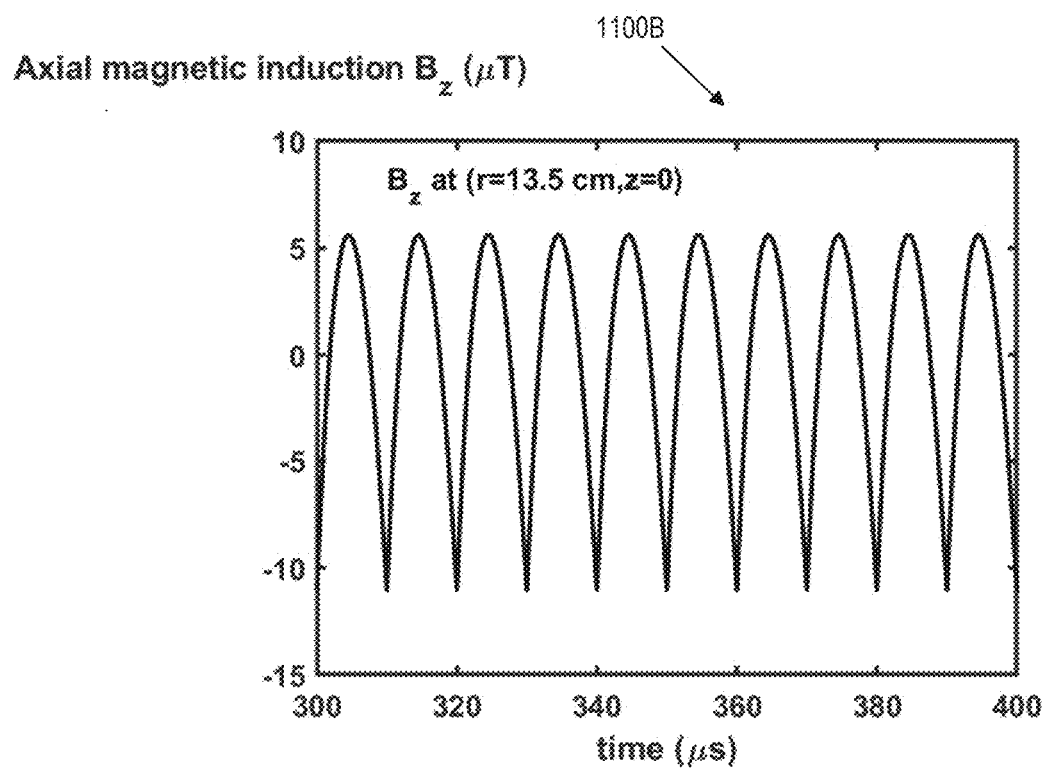
FIG. 11B is an example plot that illustrates calculated values of $B_z$ 1 cm away from the inner edge of an example coil, at (r=13.56 cm, z=0) versus time.

Referring to FIG. 11B, a plot 1100B illustrates calculated values of $B_z$ 1 cm away from the inner edge of the coil 704

(FIG. 7), at (r=13.56 cm, z=0) versus time. The calculated peak-to-peak value of between ~ 15 µT overpredicts the measured value of ~ 4 µT.

Also shown are the calculated values which reproduce the qualitative features of $B_z$ versus time, but overpredict the measurements. It can also be seen that the measurements reported with the coil 704 (FIG. 7) confirm that this coil reproduces iEF intensities (~2.5 µTpp measured at r=0 and ~4 µTpp measured at r=13.5 cm).

Figure 12:
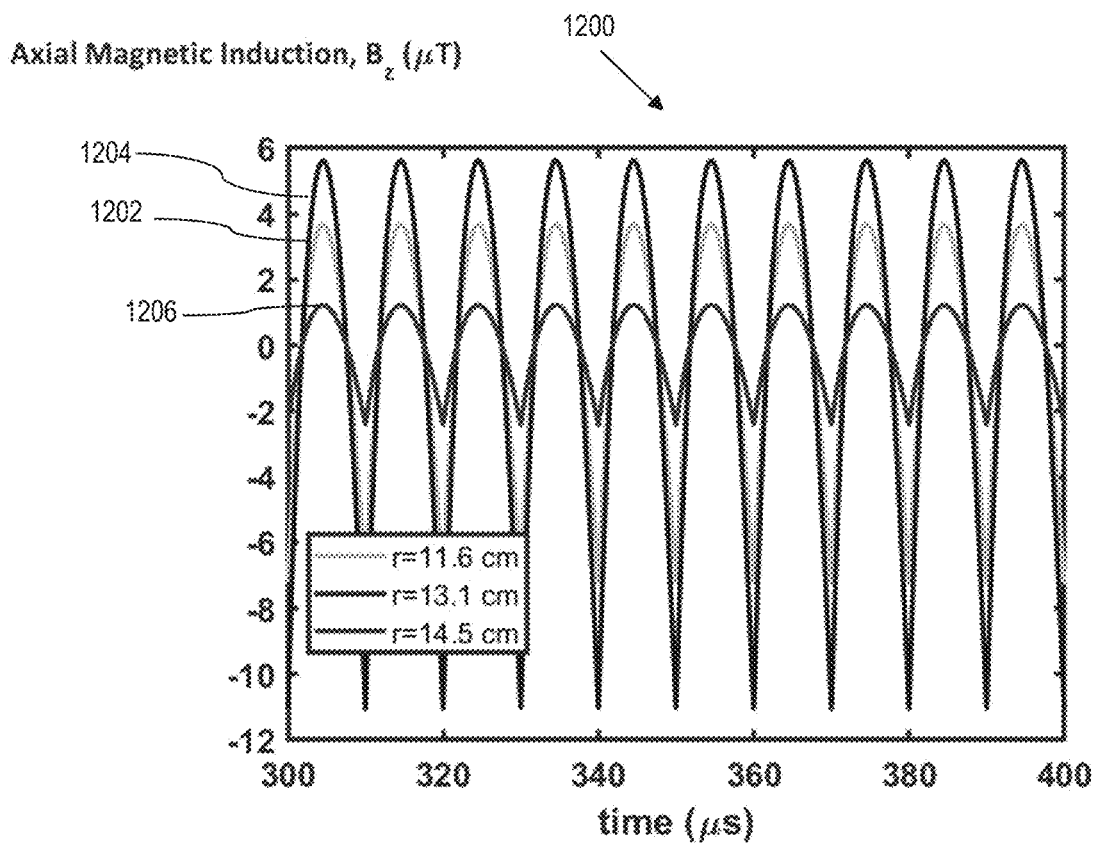
FIG. 12 is an example plot that illustrates the negative of the calculated axial component of the magnetic induction, $B_z$ versus time near the center plane (z=0) for three different radial locations near the edge of the coil (r=11.6 cm, r=13.1 cm, and r=14.5 cm, for the coil of FIG. 7.

Referring to FIG. 12, a plot 1200 illustrates how sharply $B_z$ varies with the radial coordinate near the edge of the coil. Since the location at which the $B_z$ measurements are made are only accurate to a few millimeters, this may explain the difference in the predicted and measured values of $B_z$ since the radial edge location at which $B_z$ is measured does not exactly correspond to the location at which it is calculated. Nevertheless, the electromagnetic fields produced at human anatomical scales by the coil 704 (FIG. 7) match previous iEFs used to successfully hinder primary triple-negative breast tumor growth and pulmonary metastases in laboratory mice.

More particularly, FIG. 12 illustrates the negative of the calculated axial component of the magnetic induction at the center plane of the coil, $B_z$ at z=0, which is illustrated versus time for three different radial locations near the edge of the coil. In particular, FIG. 12 illustrates curve 1202 (r=11.6 cm), curve 1204 (r=13.1 cm), and curve 1206 (r=14.5 cm). As shown in FIG. 12, at this location, the field varies sharply with the radial coordinate r, and may explain the discrepancy between calculated and measured $B_z$ values as the locations at which the comparisons can be off by a few millimeters which is enough to change $B_z$ significantly.

Figure 13:
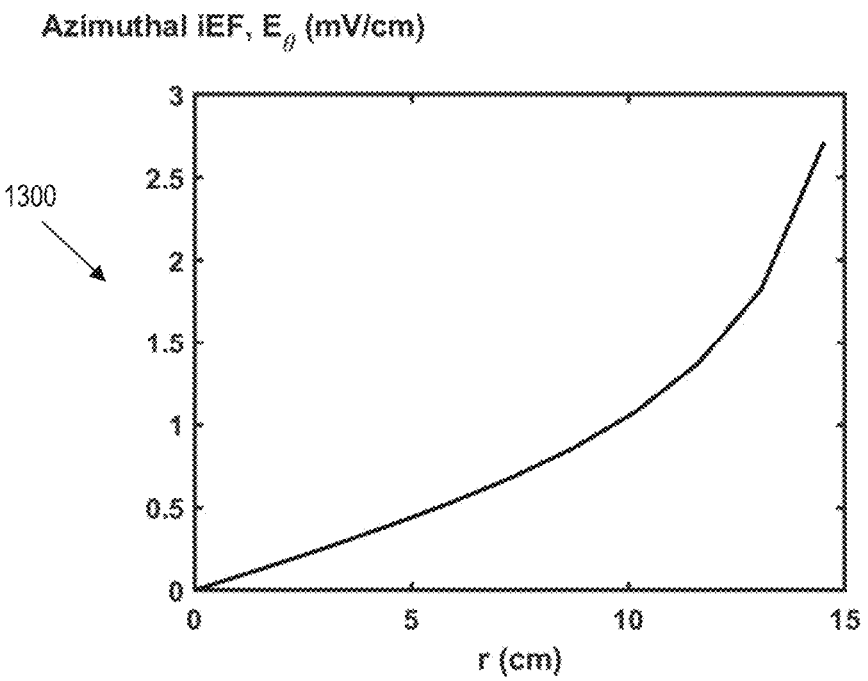
FIG. 13 in an example plot illustrating the calculated azimuthal component of the iEF, $E_q$ versus a radial coordinate at the centerline of the coil of FIG. 7.

Referring to FIG. 13, a plot 1300 illustrates the calculated azimuthal component of the iEF, $E_q$, is illustrated, versus radial coordinate at the centerline of the coil 700 (FIG. 7). Note that the maximum iEF predicted is ~2.5 mV/cm and occurs toward the inner edge of the coil.

Figure 14:
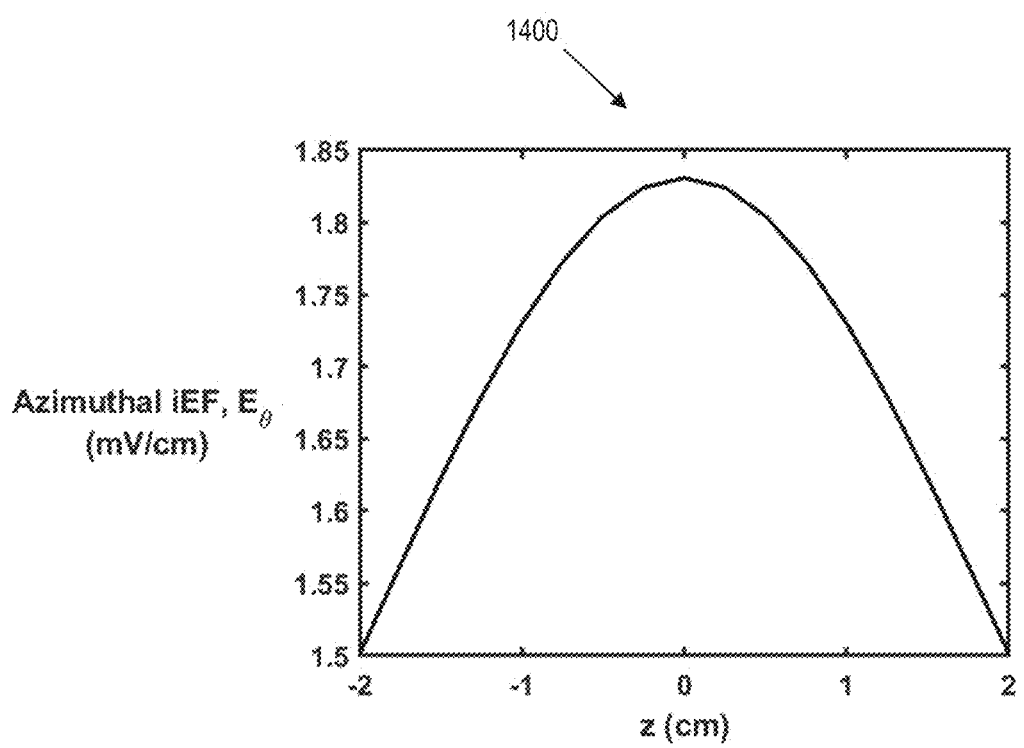
FIG. 14 is an example plot illustrating a calculated azimuthal component of the iEF, $E_q$ versus axial coordinate, z, radially 1 cm inside the coil of FIG. 7.

Referring to FIG. 14, a plot 1400 illustrates the calculated azimuthal component of the iEF, $E_q$, is illustrated versus axial coordinate, z, radially 1 cm inside the coil 704 (FIG. 7). Note that the maximum iEF of ~1.8 mV/cm occurs toward the center of the coil and away from the ends, as expected. Nevertheless, throughout the space inside the coil, the iEF is fairly uniform ranging from ~1.5 mV/cm to ~1.8 mV/cm.

Referring to FIG. 13 and FIG. 14 generally, plots illustrate profiles of calculated iEF versus r at the center plane of the coil, and iEF versus axial coordinate z approximately 1 cm from the edge of the coil, respectively. As can be seen in these figures, the magnitudes of the iEF are on the order of a few mV/cm.

Figure 15:
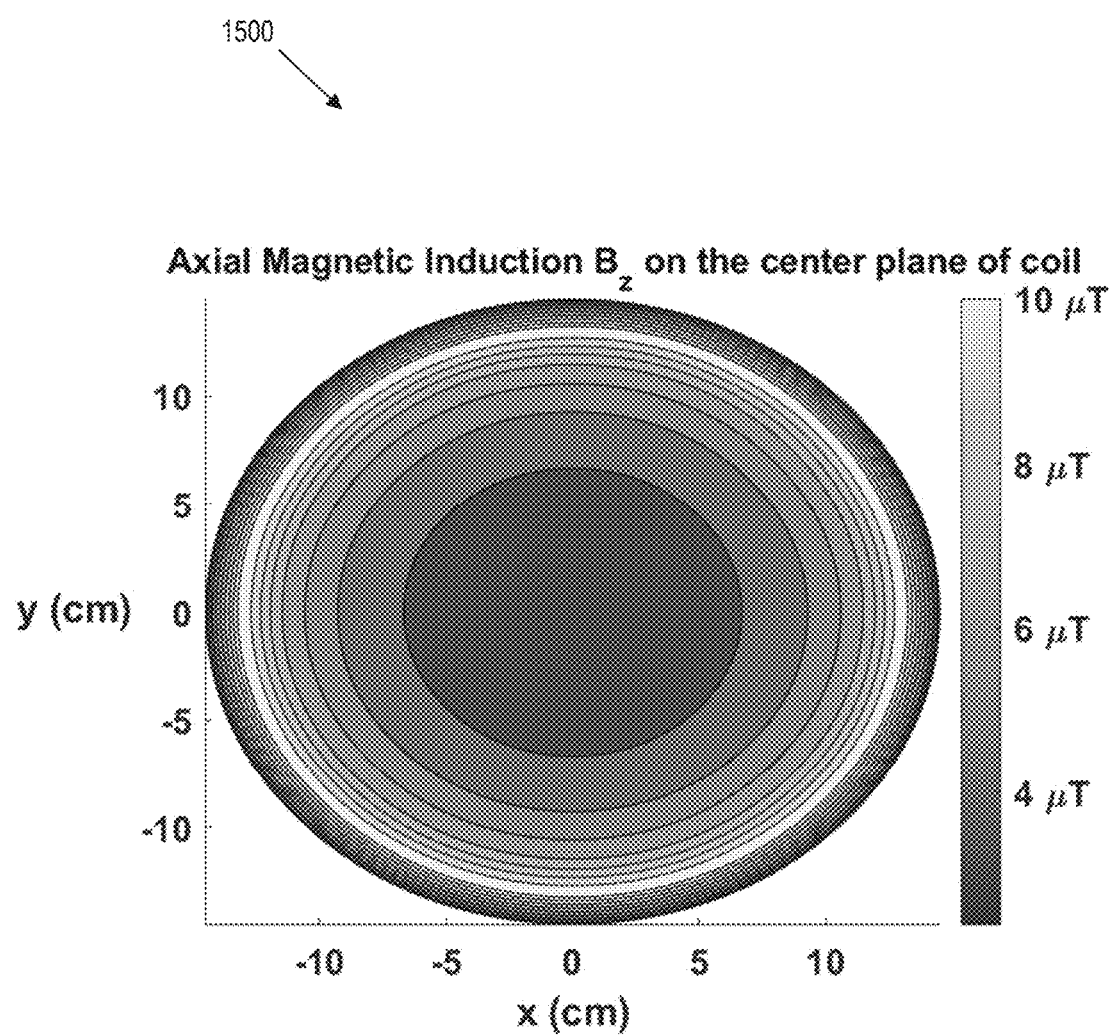
FIG. 15 is an example contour plot of axial magnetic induction on the center plane of the coil of FIG. 7.

Referring to FIG. 15, a contour plot 1500 illustrates the calculated axial component of magnetic induction $B_z$ at the center plane of the coil 704 (FIG. 7). Note that the maximum $B_z$ occurs toward the edge coil, in agreement with measurements. As can be seen from this figure, the time-varying magnetic field permeates the entire space of the coil and will induce a non-zero iEF everywhere in the space contained within the coil except of course, at the centerline, where, by symmetry, it is identically zero.

A practical realization of this type of treatment would involve the patient wearing (continuously or intermittently) the iEF wearable device until treatment is completed as determined by standard diagnostic techniques (CT scans, PET scans, ultrasound, biopsy, etc.). It is anticipated that this type of cancer treatment would be free of the harmful side effects of chemotherapy, immunotherapy, and radiation, and could be used as neoadjuvant (before surgery) or adjuvant (after surgery) and in combination with standard of care chemotherapies, immunotherapies, and other immuno-oncological treatments.

Example Signal Generator

Figure 16:
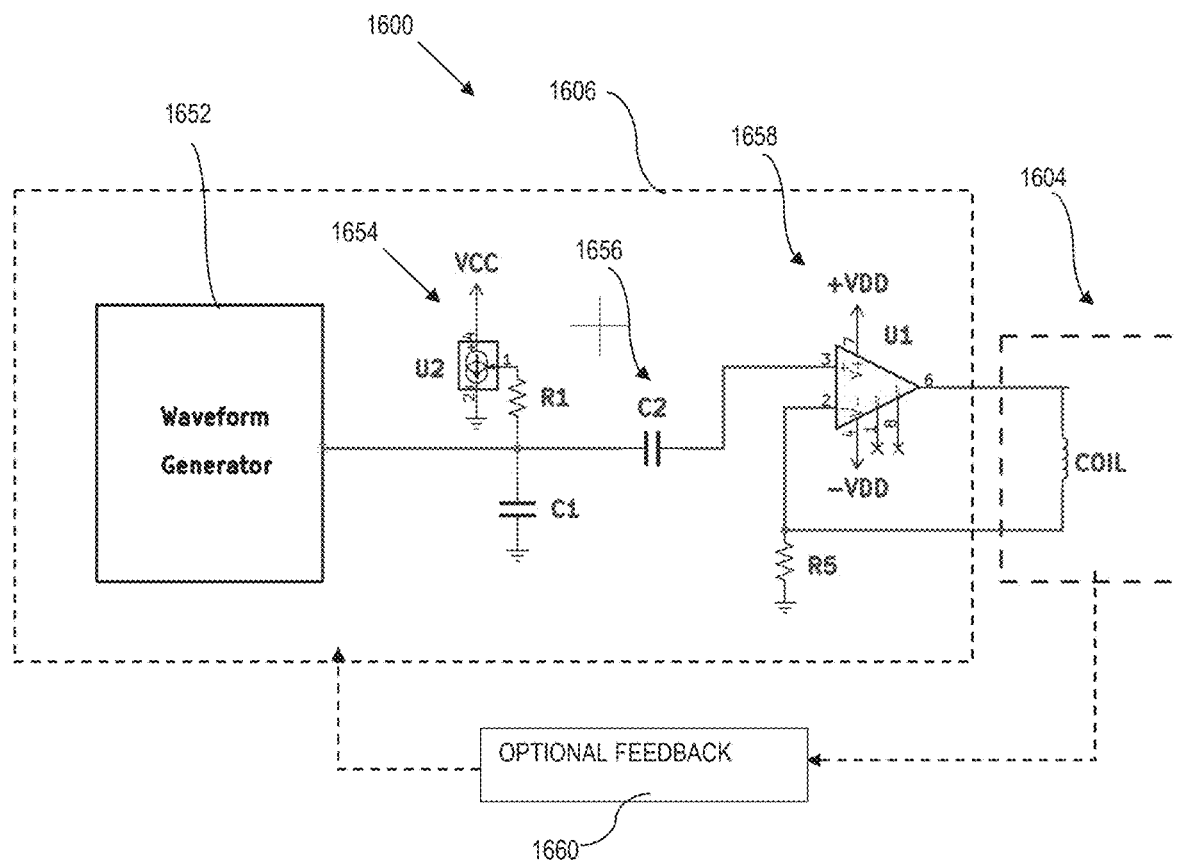
FIG. 16 is a schematic diagram for a signal generator that can be implemented with the controller described herein.

Referring to FIG. 16, a block diagram 1600 of a circuit topology for a signal generator and coil driver of a controller 1606 is illustrated. The illustrated controller 1606 is analogous to the controller 106 (FIG. 1A-FIG. 1E); controller 206 (FIG. 2), controller 706 (FIG. 7) etc., as described herein. In this regard, FIG. 16 illustrates for clarity of discussion, a waveform generator and corresponding driver. However, the signal generator of FIG. 16 can incorporate any one or more other/additional features described throughout.

Moreover, the controller 106 (FIG. 1A-FIG. 1E); controller 206 (FIG. 2), controller 706 (FIG. 7) etc., as described herein, can include any features described with reference to the controller 1606.

The signal generator comprises a waveform generator 1652, e.g., an astable multivibrator. The waveform generator 1652 generates a suitable waveform, e.g., an asymmetric waveform such as a sawtooth as described more fully herein. Here, the waveform generator 1652 can be analog or digital so long as the waveform generator 1652 can generate the desired drive signals (e.g., sawtooth). For instance, the waveform 1652 generator can be virtual, e.g., implemented by code in the controller. The waveform generator 1652 can also be an electrical circuit that forms a function generator. Regardless, the waveform generator 1652 can be miniaturized to be seamlessly integrated into wearable iEF therapy devices.

The circuit also comprises a bias control 1654 (see semiconductor U2, resistor R1 and capacitor C1). The bias control 1654 biases the output of the waveform generator 602.

The circuit also includes AC coupling 1656, e.g., as implemented by capacitor C2. The AC coupling 1656 couples the output of the waveform generator 1652/bias control 1654 to a buffer 1658 that functions as a coil driver.

More specifically, the buffer 1658 includes a buffering circuit (e.g., see, buffering implemented by buffer/amplifier U1 and support circuitry R5 that buffers the AC coupled waveform to a corresponding coil 1604 (analogous to the coil 104, FIG. 1A-FIG. 1E and as described more fully herein). In the illustrated circuit, the coil 1604 is provided in the garment (not shown) to which the controller is coupled. For instance, as schematically illustrated, the coil 1604 is provided in a feedback loop of the buffer 1658.

In some embodiments, an optional feedback circuit 1660 is provided. For example, the feedback can be used for changing tumor conductivity as it is treated to alter the current through the coil to vary the iEF, to diagnose the extent to which iEF therapy is working by monitoring changing tumor electrical characteristics, or both. In this regard, a sensor, measurement device, or other source (e.g., see Feedback 222, FIG. 2) can provide suitable measurements that are fed back to the controller 1606. The controller 1606 can process the feedback data in combination with data necessary to control the waveform generator, e.g., to change wave shape, to change amplitude, frequency, or any other controllable parameters.

To achieve the desired functionality, there are many circuit implementation options, including programmable logic integrated circuits/semiconductors to achieve the intent of this circuit topology for miniaturization that can all implement the described functionality.

Also, the controller can also include additional circuitry, e.g., a processor, memory, communication devices, e.g., Bluetooth, I/O, data collection, feedback control, etc.

The block diagram of FIG. 16 is an illustration of high-level functionality and is not meant to be exclusive of other designs. The label "Coil" refers to an electromagnetic coil (e.g., coil 104, FIG. 1A-FIG. 1E) that is designed to deliver iEF therapy as shown and described more fully herein.

Segmented Coils

In some implementations, coils can be segmented, or there can otherwise be multiple coils. The segmented and/or multiple coils can serve similar or different purposes. For instance, a coil can be provided for generating the iEF, a coil can be provided for inductive coupling, a coil can be providing as a sensing coil, etc.

For instance, in an example of a segmented coil, each winding (or group of windings) of the coil is a separate, closed loop. Each separate closed loop is not physically electrically connected to the others, but will be inductively connected. Then, one or more of these segregated windings (sewn into the garment) can be used as a driver or source to carry the current driven by the sawtooth voltage waveform while the other segregated windings generate iEF via current flowing in them because of the time-varying magnetic field in the driver/source windings. Furthermore, some of these segregated windings can serve to sense variations in the iEF caused by changes in the electrical properties of tumor bearing tissues. Yet another design can have some of these segregated windings carrying a sinusoidal current (which can provide a reference signal for phase-lock amplification and detection).

Miscellaneous

Most conventional coils are designed to operate at the resonant frequency as that is optimum for driving a maximum current through a coil. However, a device that delivers iEF therapy herein produces the highest possible iEF which by Faraday' law, is related to how quickly the magnetic induction changes with time. To produce the largest dB/dt (and hence the highest iEF), it is necessary to have the highest B field possible that changes as quickly as possible in time. The maximum and minimum values of $B_z$, corresponding to $dB_z/dt=0$, and the locations of the minima for $B_z$ and maxima/minima of $dB_z/dt$ occur at different times though only slightly temporally apart from $B_z$.

Although embodiments herein use variations on a single coil, aspects of the present disclosure are not limited as such. In this regard, a device can include multiple coils, e.g., segmented coils.

In this regard, the controller can comprise waveform generation to independently control each coil. This allows all coils to be used for therapy, generating iEF fields. As an alternative, one or more coils can perform different functions, e.g., a first coil could be used for applying iEF treatment, whereas a second coil can be used to activate the iEF coil (first coil) inductively.

Alternatively, a coil can be used for sensing, monitoring of the progress of treatment, and feedback control.

In various embodiments, only a single coil (such as the coils used for iEF treatment) may be necessary. For instance, a Standing Wave Reflection Ratio (SWRR) method and/or a Time Domain Reflection (TDR) method may be utilized for measuring the phase and phase-sensitive amplitude of the current and/or voltage in one or more dedicated coils or a segmented coil within a single assembly (i.e., coils with windings that are segmented and are dedicated to specific tasks).

For instance, Standing Wave Reflection (SWR) ratio and/or Time Domain Reflection (TDR) can be utilized for monitoring progress of iEF treatment/therapy (instead of detection of cancer or distinguishing tumors from normal tissue). Basically, SWRR and/or TDR would be used to specifically interrogate the tumor bearing tissue and monitor signal changes over time as treatment continues.

SWR is a scatter parameter that is associated with coil impedance matching of output to input, or in the application herein, amp to coil matching. More specifically, SWRR is the ratio between forward and reflected waves, as measured by maximum and minimum amplitudes of the standing wave.

For SWR, a germanium diode can be placed in close proximity to an output line. The diode is reverse biased to current flow in the coil driver. The diode capacitively couples the reflected wave from any impedance mismatch. The impedance of the coil is determined by the total circuit, i.e., patient and coil. A baseline reading of the SWR is then compared to future readings, indicative of a change in the effected tissue within the near-field range of the coil.

Energy losses in the coil due to capacitive coupling in the tumor and tumor-bearing tissue can cause a change in the inductive reactance ($X_L$) of a coil. The interference between the incident wave and reflected wave results in a standing wave, which is directly affected in phase and magnitude by this change. In various embodiments, the coil can be specifically designed to limit capacitive reactance and therefore is predominantly governed by inductive reactance. The capacitive reactance is further diminished by the low frequencies used in the monitoring coil. Embodiments may utilize an input frequency between 1 Hz and 1 MHZ (e.g., 99 kHz), through the monitoring coil. As designed, the phase shift is dependent on the resistive term and inductive reactance.

$$\tan \phi = X_L/R$$

A reference measurement of the SWR can be taken in the tumor-bearing tissue at the beginning of iEF treatment, summed with an adjustable voltage to achieve a null point can be stored. Any change in tumor-bearing tissue properties after a period of iEF treatment may then be measured and compared. Alternatively, the characteristics of the standing wave can be examined using Fast Fourier Transforms (FFTs), which can yield the phase shift as iEF treatment progresses.

Time Domain Reflection is a temporal measurement of the reflected wave. In a TDR application, the coil is subjected to a fast pulse, e.g., in the picosecond range. The controller then monitors flight time of both forward and reflected pulses. Impedance mismatch caused by capacitive changes generates reflected pulses at the location of the mismatch, essentially giving the system the ability to know the location of the anomaly. As the tumor changes or spreads the TDR signature will change. A very coarse tomography can be collected using the capacitive and inductive characteristics of the patient. For example, a coil of X feet has a propagation delay based on the conductivity of copper. The reflection caused by any impedance mismatch is at a specific location along that conductor. The distance being determined by the reflection pulse arrival time relative to the first pulse departure.

With TDR, the monitoring coil is used in an open circuit configuration. A step input with a very rapid slew rate is applied to a monitoring coil with the iEF treatment momentarily interrupted for interrogative purposes. A finite time will elapse before the reflected wave is detected by the measurement device. This time signature, before iEF treatment is commenced, is dependent on the monitoring coil's inductive reactance, which is sensitive to capacitive coupling with the tumor-bearing tissue. The measurement is then repeated at a later time point once iEF treatment has been active for some time. Differences between the recorded delay when iEF treatment is begun versus any other desired time point after treatment has commenced can then monitor progress of iEF therapy. The larger the capacitive coupling between the monitoring coil and the tumor-bearing tissue by the step pulse, the longer the delay.

In this regard, the monitoring features of TDR and/or SWRR are enhanced herein by the conductive thread because some of the plurality of conductors of the thread can be used to produce the iEF and the rest for TDR or SWRR, or other applications, thus using a single coil for multiple tasks.

As yet another example, one or more coils in the garment can be utilized to implement Near-Field monitoring of the progress of iEF treatment. The spectral content of a sawtooth waveform or one with a rapid rise and/or fall, allows the coil producing iEF treatment to utilize the reactive Near Field to monitor progression of treatment by sensing local distortions in the E and B fields generated in response to the iEF. The distortions are available for analysis through all bands associated with Near Field communications.

Progression of iEF treatment can be further monitored by sensing the capacitive distortion caused by abnormal vascular growth within the reactive Near Field. The odd and even harmonics generated from the sawtooth waveform allow penetration into the radiative and Fresnel zone of the coil and thus the tumor-bearing tissue, by utilizing the lower region of the harmonic content which is needed for deeper introduction of iEFs. Utilizing "loops" or beads placed external to the main coil allow the radiative near-field to focus E fields onto tumors or sensors located in the radiative zone of the main iEF-producing coil. This enables the coil(s) to apply iEFs to affect tumors at even deeper depths. Furthermore, analysis by post-demodulation of the original excitation being distorted by Far-Field reception after passage through the tumor-bearing tissue will enable progress of iEF therapy.

In some embodiments, such as where the controller includes a transceiver, the data can be processed inside the controller, or the controller can communicate the data, e.g., via Wi-Fi, Bluetooth, etc., to an external processing device, e.g., a smartphone, computer, remote server, etc.

Yet further, coils can be established for targeted as well as non-targeted applications, e.g., using shaped coils where the shape focuses the E and M field on to a specific and desired location.

In this regard, multiple coils can be energized at the same time, or at different times. The waveforms and frequencies caused by energizing multiple coils would be and could be different. For example, the iEF coil could have a sawtooth at 100 kHz, whereas a sensing coil could be a sine wave at some other frequency, with the treatment monitoring coil being yet another waveform or a sinusoidal wave with yet another frequency. The various frequencies are expected to be below 1 MHz, however, aspects herein are not limited to such.

A practical realization of this type of treatment may involve, for example, a patient wearing (continuously or intermittently) the iEF wearable device coupled to a corresponding controller. In some embodiments, the controller is separate from the garment/coil and is electrically coupled to the coil, e.g., by a corresponding cable. In other embodiments, the controller can be built into the garment, or otherwise provided integral therewith.

Also, aspects herein are not limited to a single coil in a single anatomical area. For instance, an application could include by way of example, a first coil around the torso, a second coil on the chest and a third coil on the back, then randomly/or sequentially firing each coil one at a time, or firing all coils or a combination of coils together.

Yet further, due to the flexibility of integrating coils to the garment itself, e.g., via sewing, the coil shape is not limited to a circular coil. Coils can take on square, oval, complex, or other shapes as the garment and application enable. In this regard, the controller and corresponding waveform generator would need to be tweaked to accommodate such differences, which may manifest in inductances, DC resistances, intrinsic capacitances, and resonant frequencies.

Non-Resectable Tumors

In some embodiments, the iEF therapy delivering garment provides a non-targeted field. As such, the use of the iEF therapy delivering garment herein is suitable for applications such as for non-resectable tumors or other masses that cannot be treated by surgery, usually because of their location, e.g. proximity to or immersed in critical vasculature like a major artery or in an organ that cannot be resected or involving a major organ that would be damaged irreparably by surgery in an attempt to remove the tumor, etc.

Moreover, because of the inductive ability of the controller, aspects herein are suitable for integration with implantable devices. For instance, the controller 106 (FIG. 1A-FIG. 1E), controller 206 (FIG. 2) can inductively drive not only a coil in a corresponding garment, but also a coil implanted in a body, e.g., to provide targeted iEF therapy. In this regard, aspects herein can provide non-targeted iEF therapy, targeted iEF therapy, or a combination of targeted and non-targeted, using any combination of coils that are either inductively driven, or driven via electrical connection.

Example Cancer Trajectory—Breast Cancer

As a working example of a woman with breast cancer, assume a patient has a solid mass that is detected either because of routine examination (palpation, mammogram, or other) or she may be symptomatic. Typically, a biopsy would be done along with a CT scan or in an extreme case, MRI or PET scan following a CT. From the pathology and other analysis, it would be determined what type of breast cancer (BC) it is. Depending on the diagnosis, the patient may be referred for surgery immediately, or radiation treatment first or neo-adjuvant immuno-oncological (chemo and/or immunotherapy) treatment followed then by surgery. At the time of surgery, the tissue would be analyzed for any residual cancer via histopathology to determine if there is pathologic complete response (pCR) defined as an absence of cancer in the breast and ancillary lymph nodes. pCR is associated with better long-term survival.

Most of the time, pCR is not achieved following neo-adjuvant chemotherapy and surgery, and that is quantified by a Residual Cancer Burden index or RCB index, used as a prognostic indicator. The RCB index quantifies residual disease by combining pathological findings in the primary tumor bed and regional lymph nodes to calculate a continuous index. An RCB=0 indicates pCR, RCB=I or 1 indicates minimal tumor burden, RCB=II or 2 indicates moderate tumor burden, and RCB=III or 3 indicates extensive tumor burden. Patients who have an RCB in the range of I-III are at risk of recurrence, with those having a higher RCB index with a higher and quicker rate of recurrence. For TNBC, over 40% of patients experience rapid relapse with a peak at 3 years from diagnosis. For patients in whom there is an RCB of 1-3, since they have already been given chemotherapy and/or immunotherapy, they are offered the same treatment again as there is conventionally, no other treatment available (for example if a patient receives only chemo as a neo-adjuvant therapy and they happen to qualify for immunotherapy (about 20% do), then they may be offered pembrolizumab (immunotherapy), and if they do not qualify, they may be offered a different chemotherapy agent (e.g., if they had paclitaxel/taxol as a neo-adjuvant chemo, they may be offered capecitabine or vice versa). Sometimes patients may be given chemo and immunotherapy neo-adjuvantly ahead of surgery.

In this regard, the device herein can focus on those patients with an RCB index 1-3 as they are at highest risk of recurrence with no other recourse than the immuno-oncological treatment that has already been previously administered to them. With the iEF technology disclosed herein as an adjuvant treatment, patients with an RCB index of I, II, or III can wear the iEF delivery system after surgery while they receive standard of care immuno-oncological treatment.

If the tumor electrical characteristics change over time, this will not affect the coil characteristics but affect the sensing coils (discussed more fully herein-see for example, the discussion of segmented coils, feedback 222, etc.). As the tumor shrinks or undergoes necrosis, the applied B field and iEF will not change but the charge distributions in the tumor-bearing tissue will be altered by the applied iEFs. In other words, changes in the tumor have a negligible effect on the coil applying the iEF. In this regard, chemotherapy can optionally be administered along with iEFs if iEF treatment is used as an adjuvant.

Additional Considerations

The controller, including the function generator, can be powered by rechargeable batteries, until treatment is completed as determined by standard diagnostic techniques (CT scans, PET scans, ultrasound, biopsy, etc.). It is anticipated that this type of cancer treatment would be free of the harmful side effects of chemotherapy, immunotherapy, and radiation, and could be used as neoadjuvant (before surgery) or adjuvant (after surgery) and in combination with standard of care chemotherapies, immunotherapies, and other immune-oncological treatments. Furthermore, once established as a cancer treatment and anti-metastasis modality, iEF application could be used to prevent cancer in the first place.

Notably, the iEF fields do not "deposit energy" into the tissue of the patient. Rather, the fields alter the electrical signals in the body, affecting the tumor's ability to receive instructions to continue to grow. There is no current flow in the tissue, and therefore, no power dissipation in the tissue. In this regard, in some embodiments, the field strength may be in the 1 pT-0.199 mT, 1 fT-0.199 mT, etc. In some embodiments, the field strength can be relatively stronger, e.g., over 5 mT.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A device for administering therapy, comprising:
   a washable, wearable garment, the garment comprising a conductive coil constructed using an insulated conductive thread that is integrated into a fabric of the garment; and
   a controller comprising:
      a waveform generator that produces a time-varying drive signal; and
      a feedback circuit comprising a matching network;
   wherein:
      the drive signal is communicably coupled to the conductive coil of the garment in a manner as to generate an electric field as a non-targeted induced electric field that does not generate current flow in tissue of the individual wearing the garment;
      the controller, via the feedback circuit, detects changes in a mass within a patient wearing the garment by detecting variations in current flowing in a circuit with the conductive coil;
      the variations in the current flowing in the circuit are indicative of the changes in electrical characteristics in the mass within the patient that trigger an applied B field to change, which in turn affects the current flow in the coil; and
      the controller monitors the matching network to detect changes in current through the coil indicative of the changes in the electrical characteristics of the mass.

2. The device of claim 1, wherein the controller is configured to generate the electric field in a manner as to have a magnitude in the range of 1 microvolt per centimeter ($\mu$V/cm) to 100 millivolts per centimeter (mV/cm).

3. The device of claim 2, wherein the controller is further configured to generate the electric field via a magnetic field on the order of 10 nanotesla to 10 millitesla (10 nT-10 mT).

4. The device of claim 1, wherein the waveform generator is configured to optimize the time-varying drive signal based upon how quickly a magnetic induction changes with time to produce an induced electric field having the highest possible magnitude.

5. The device of claim 1, wherein:
   the coil is integrated into the fabric of the garment in a manner as to surround at least one of a torso, limb, neck, head, digit, or appendage while the garment is worn.

6. The device of claim 1, wherein:
   the coil is integrated into the fabric of the garment in a manner that does not surround a portion of the garment through which a body part passes when while the garment is worn by an individual; and the coil, upon being driven by the controller, produces over a time interval, a heterogeneous and asymmetric B field and accompanying induced electric field.

7. The device of claim 1, wherein the conductive thread is sewn or woven into the garment using at least one of stitching, weaving, knitting, or crocheting.

8. The device of claim 1, wherein the conductive thread comprises a plurality of wire strands intertwined, braided, or both.

9. The device of claim 8, wherein the conductive thread further includes at least one of:
an insulation around each wire strand;
an insulation around the plurality of wire strands; or
at least one strengthening fiber integrated with the plurality of wire strands to provide structural support.

10. The device of claim 1, wherein the coil is integrated into the fabric by using at least one of felting, lacing, bonding, fusing, printing, or laminating.

11. The device of claim 1, wherein the waveform generator produces the time-varying drive signal as an asymmetric, periodic sawtooth waveform having a rise time of 10 microseconds or less, and a fall time of 50 nanoseconds or less, or a sawtooth waveform having a fall time of 10 milliseconds or less, and a rise time of 50 nanoseconds or less.

12. The device of claim 1 further comprising at least one washable connector integrated into the garment that detachably couples power from an external device to the controller.

13. The device of claim 1, wherein:
the conductive coil is integrated into the fabric of the garment in a manner as to form a continuous coil;
the controller communicably couples the drive signal to the conductive coil by induction;
the controller comprises a secondary coil;
the garment comprises at least one of a user-accessible pocket, a mechanical alignment mechanism, a keyed feature, or a mechanical snap that aligns the secondary coil of the controller to an external power module.

14. The device of claim 1, wherein the device only generates an alternating magnetic field.

15. The device of claim 1, wherein a field strength of a magnetic induction is in the range of a select one of:
1 picotesla (pT)-0.199 millitesla (mT),
1 femto-tesla-0.199 mT, or
up to 5 mT.

16. The device of claim 1, wherein the controller generates the electric field as a non-targeted induced electric field that operates in a manner as to stimulate a vagus or other nerve triggering a host immune system to attack a tumor somewhere else, away from the neck, in a body.

17. A device for administering therapy, comprising:
a washable, wearable garment, the garment comprising a conductive coil stitched into a fabric of the garment in a manner as to surround at least one of a torso, limb, neck, head, digit, or appendage when while the garment is worn; and
a controller comprising:
a waveform generator that produces a sawtooth drive signal; and
a feedback circuit comprising a matching network;
wherein:
the drive signal is communicably coupled to the conductive coil of the garment in a manner as to generate an electric field as a non-targeted induced electric field that does not generate current flow in tissue of the individual wearing the garment;
the controller, via the feedback circuit, detects changes in a mass within a patient wearing the garment by detecting variations in current flowing in a circuit with the conductive coil, wherein the variations in the current flowing in the circuit are indicative of the changes in electrical characteristics in the mass within the patient that trigger an applied B field to change, which in turn affects the current flow in the coil; and
the controller monitors the matching network to detect changes in current through the coil indicative of the changes in the electrical characteristics of the mass.

18. A device for administering therapy, comprising:
a washable, wearable garment, the garment comprising a conductive coil constructed using an insulated conductive thread that is stitched into a fabric of the garment; and
a controller comprising:
a waveform generator that produces a time-varying drive signal; and
a feedback circuit comprising a matching network;
wherein:
a frequency of the sawtooth drive signal is set to optimize how quickly a magnetic induction changes with time to produce an induced electric field having the highest possible magnitude;
the controller, via the feedback circuit, detects changes in a mass within a patient wearing the garment by detecting variations in current flowing in a circuit with the conductive coil;
the variations in the current flowing in the circuit are indicative of the changes in electrical characteristics in the mass within the patient that trigger an applied B field to change, which in turn affects the current flow in the coil; and
the controller monitors the matching network to detect changes in current through the coil indicative of the changes in the electrical characteristics of the mass.

* * * * *